(12) United States Patent
Krisko et al.

(10) Patent No.: US 6,966,940 B2
(45) Date of Patent: Nov. 22, 2005

(54) AIR FILTER CARTRIDGE

(75) Inventors: William Joseph Krisko, Bloomington, MN (US); Wayne R. W. Bishop, St. Louis Park, MN (US); Steven Scott Gieseke, Richfield, MN (US); Carolyn J. Finnerty, Bloomington, MN (US); David W. Nelson, Coon Rapids, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/405,432

(22) Filed: Apr. 2, 2003

(65) Prior Publication Data

US 2003/0217534 A1 Nov. 27, 2003

Related U.S. Application Data

(60) Provisional application No. 60/370,438, filed on Apr. 4, 2002, provisional application No. 60/426,071, filed on Nov. 12, 2002.

(51) Int. Cl.$^7$ .............................................. B01D 27/06
(52) U.S. Cl. ............................ 55/497; 55/498; 55/502; 55/520; 55/521; 210/450; 210/493.5
(58) Field of Search ......................... 55/497–502, 337, 55/520–521, DIG. 12; 210/446, 450, 493.1, 210/493.4, 493.5

(56) References Cited

U.S. PATENT DOCUMENTS

| | | | |
|---|---|---|---|
| 3,025,963 A | 3/1962 | Bauer | 210/493.4 |
| 3,397,518 A | 8/1968 | Rogers | 55/497 |
| 3,676,242 A | 7/1972 | Prentice | 156/62.4 |
| 3,841,953 A | 10/1974 | Lohkamp et al. | 442/350 |
| 3,849,241 A | 11/1974 | Butin et al. | 428/137 |
| 3,878,014 A | 4/1975 | Melead | 156/167 |
| 4,065,341 A | 12/1977 | Cub | 156/187 |
| 4,242,115 A | 12/1980 | Harold et al. | 55/347 |
| 4,449,993 A | 5/1984 | Bergeron | 55/379 |
| 4,746,340 A | 5/1988 | Durre et al. | 55/347 |
| 5,423,892 A | 6/1995 | Kahlbaugh et al. | 55/320 |
| 5,435,870 A | 7/1995 | Takagaki et al. | 156/189 |
| 5,487,767 A | 1/1996 | Brown | 55/357 |
| 5,543,007 A | 8/1996 | Takagaki et al. | 156/189 |
| 5,547,480 A | 8/1996 | Coulonvaux | 55/498 |
| 5,569,311 A | 10/1996 | Oda et al. | 55/493 |
| 5,613,992 A | 3/1997 | Engel | 55/432 |
| 5,620,505 A | 4/1997 | Koch et al. | 96/134 |
| 5,667,545 A | 9/1997 | Honda et al. | 55/497 |
| 5,674,302 A | 10/1997 | Nakayama et al. | 55/385.3 |

(Continued)

FOREIGN PATENT DOCUMENTS

EP 0 133 565 7/1984

(Continued)

OTHER PUBLICATIONS

Declaration of Wayne R. W. Bishop and Exhibits A-D (7 pages), Aug. 12, 2003.

*Primary Examiner*—Richard L. Chiesa
(74) *Attorney, Agent, or Firm*—Merchant & Gould P.C.

(57) ABSTRACT

A filter element, a safety element and fluid cleaner assembly. The fluid cleaner assembly generally includes a housing having a cover and a primary fluid cleaner section. The element generally includes z-filter media, arranged in a straight through configuration, and an axial seal gasket positioned to extend continuously around at outer perimeter of the straight through flow construction. The fluid cleaner assembly can have a precleaner positioned therein. Methods of assembly and use are provided.

27 Claims, 17 Drawing Sheets

U.S. PATENT DOCUMENTS

| | | | |
|---|---|---|---|
| 5,679,122 A | 10/1997 | Moll et al. | 55/497 |
| 5,714,126 A | 2/1998 | Frund | 422/122 |
| 5,730,766 A | 3/1998 | Clements | 55/341.1 |
| D396,098 S | 7/1998 | Gillingham et al. | D23/365 |
| 5,782,944 A | 7/1998 | Justice | 55/495 |
| 5,792,229 A | 8/1998 | Sassa et al. | 55/497 |
| 5,795,361 A | 8/1998 | Lanier, Jr. et al. | 55/502 |
| D398,046 S | 9/1998 | Gillingham et al. | D23/365 |
| D399,944 S | 10/1998 | Gillingham et al. | D23/365 |
| 5,820,646 A | 10/1998 | Gillingham et al. | 55/488 |
| 5,902,361 A | 5/1999 | Pomplun et al. | 55/385.3 |
| 5,958,097 A | 9/1999 | Schlor et al. | 55/497 |
| D417,268 S | 11/1999 | Gillingham | D23/365 |
| D425,189 S | 5/2000 | Gillingham et al. | D23/365 |
| D428,128 S | 7/2000 | Gillingham et al. | D23/365 |
| D437,402 S | 2/2001 | Gieseke et al. | D23/365 |
| 6,187,073 B1 * | 2/2001 | Gieseke et al. | 55/485 |
| 6,190,432 B1 | 2/2001 | Gieseke et al. | 55/385.3 |
| D439,963 S | 4/2001 | Gieseke et al. | D23/365 |
| 6,221,122 B1 | 4/2001 | Gieseke et al. | 55/500 |
| 6,235,195 B1 | 5/2001 | Tokar | 210/238 |
| D447,549 S | 9/2001 | Gieseke et al. | D23/365 |
| D450,827 S | 11/2001 | Gieseke et al. | D23/365 |
| D450,828 S | 11/2001 | Tokar | D23/365 |
| 6,348,084 B1 | 2/2002 | Gieseke et al. | 95/273 |
| 6,350,291 B1 | 2/2002 | Gieseke et al. | 55/385.3 |
| D455,483 S | 4/2002 | Gieseke et al. | D23/365 |
| D461,003 S | 7/2002 | Gieseke et al. | D23/365 |
| 6,416,561 B1 * | 7/2002 | Kallsen et al. | 55/482 |
| D461,884 S | 8/2002 | Gieseke et al. | D23/365 |
| D466,602 S | 12/2002 | Gieseke et al. | D23/365 |
| 6,517,598 B2 | 2/2003 | Anderson et al. | 55/498 |
| 6,783,565 B2 * | 8/2004 | Gieseke et al. | 55/385.3 |
| 6,852,141 B2 * | 2/2005 | Bishop et al. | 55/385.3 |

FOREIGN PATENT DOCUMENTS

| | | |
|---|---|---|
| JP | 08028376 | 1/1996 |
| WO | WO 89/01818 | 3/1989 |
| WO | WO 97/40918 | 11/1997 |
| WO | WO 01 34270 | 5/2001 |

* cited by examiner

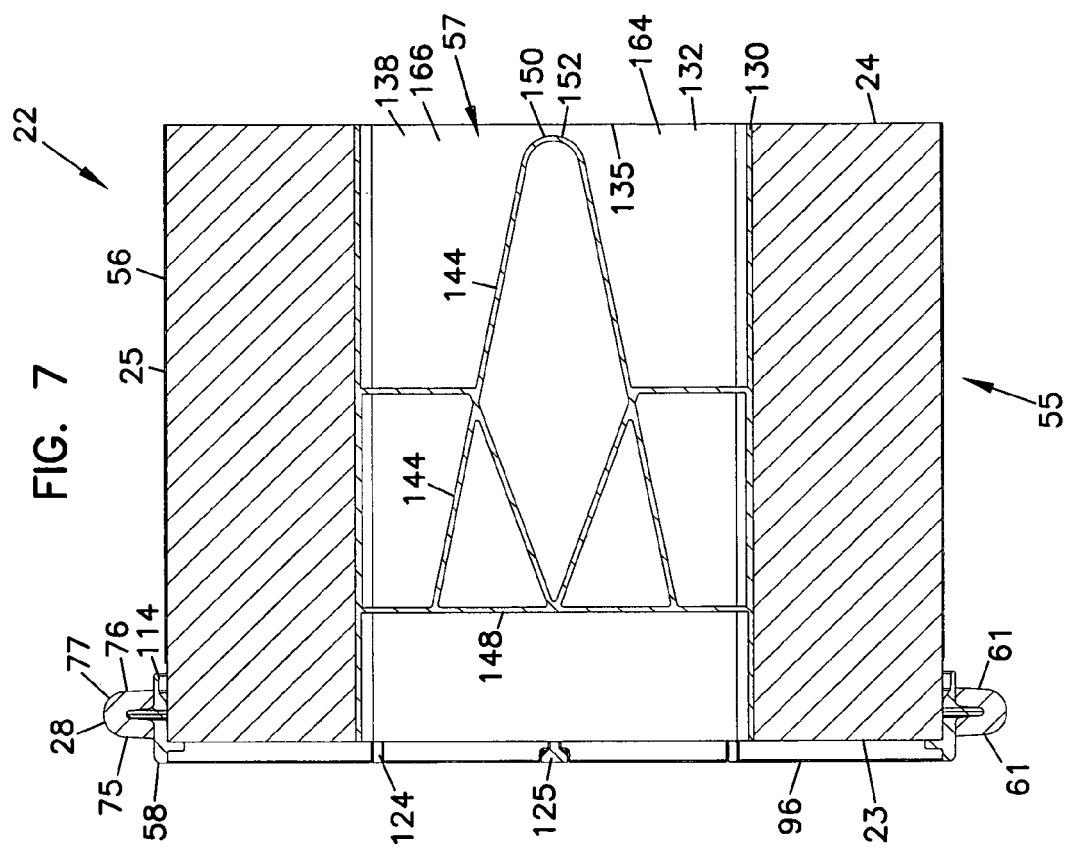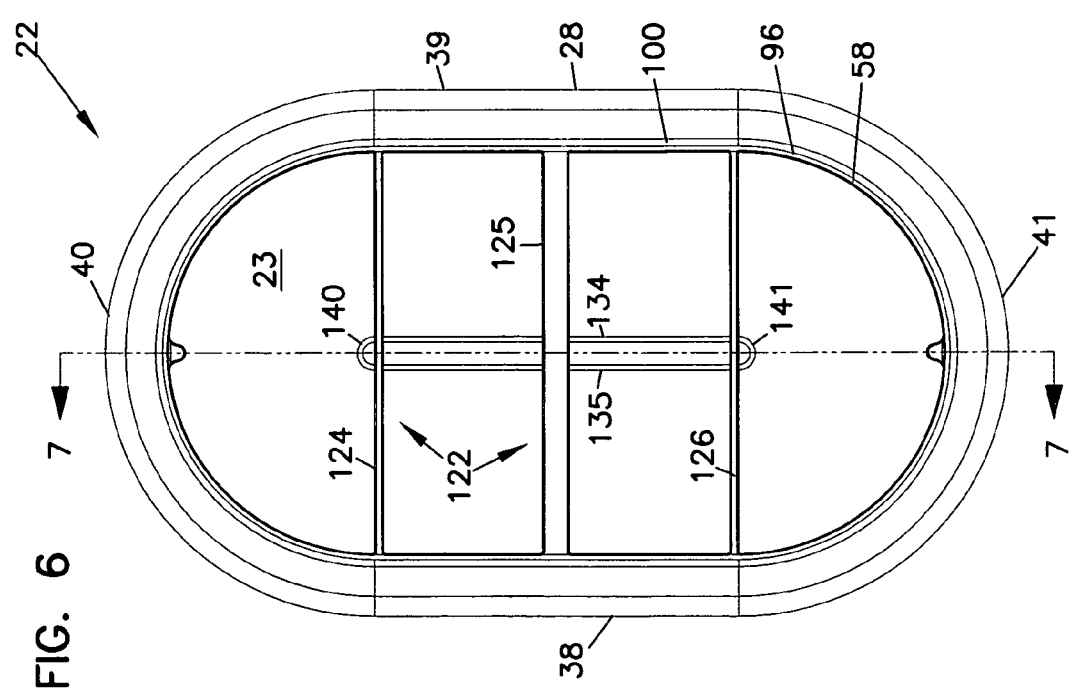

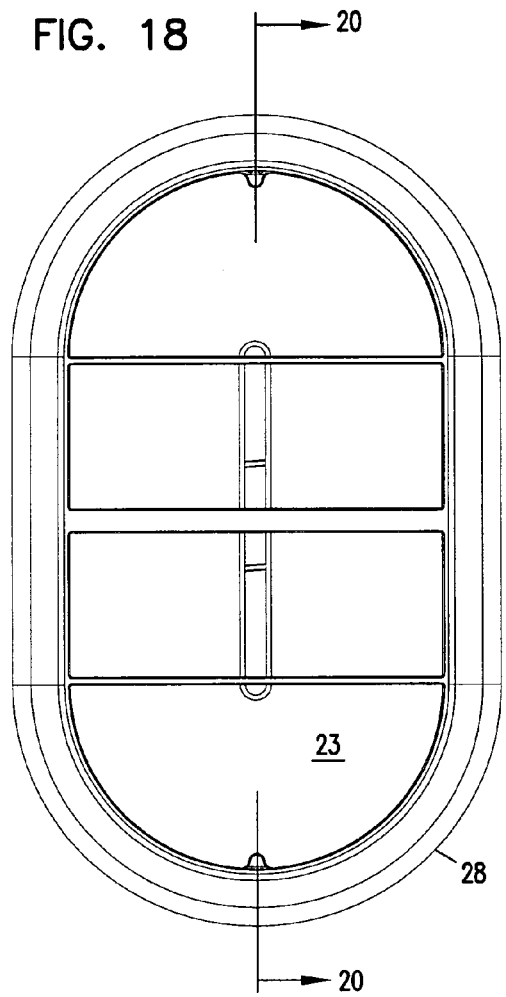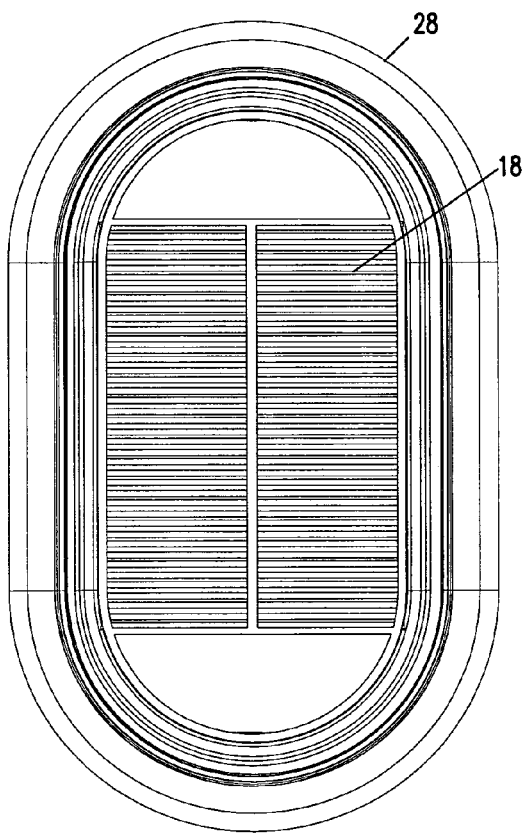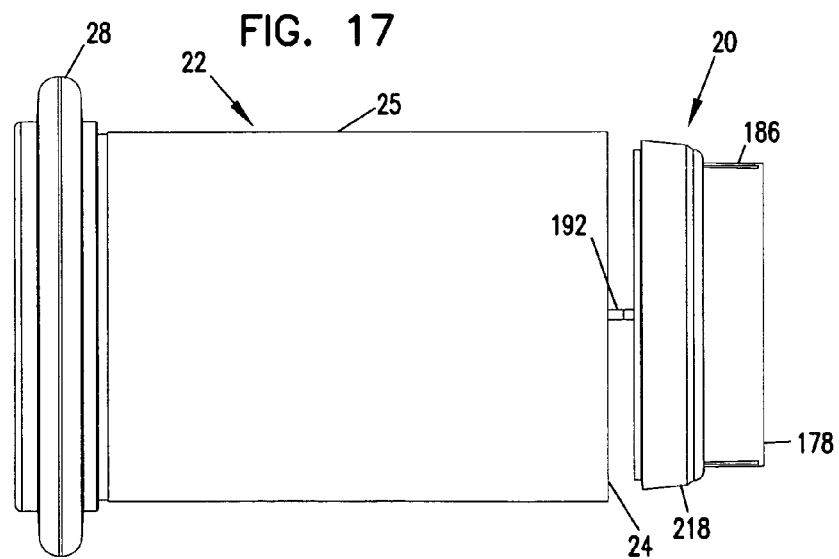

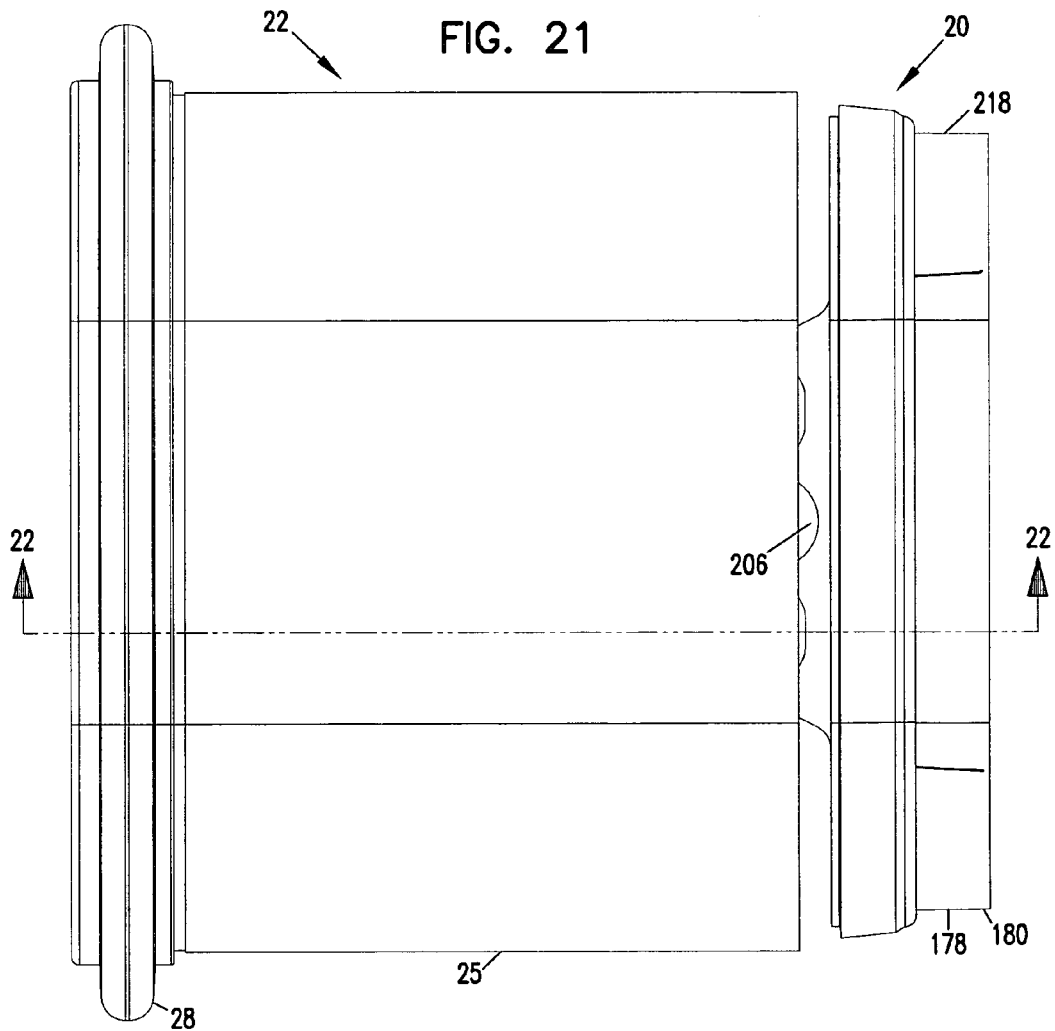
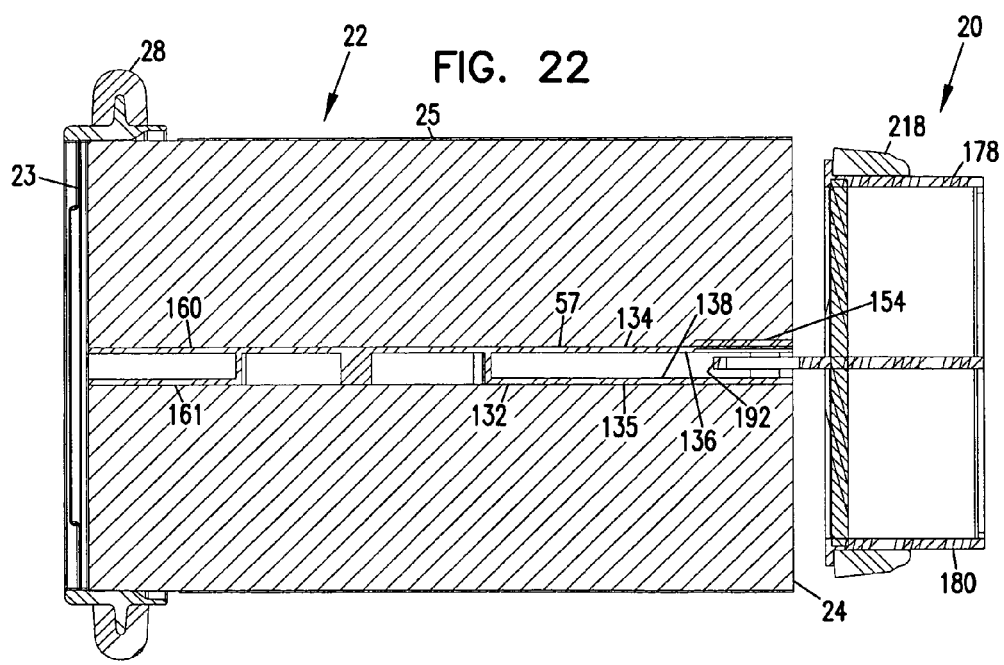

AIR FILTER CARTRIDGE

CLAIMS TO PRIORITY

This disclosure claims priority under 35 U.S.C. §119(e) to U.S. provisional patent application No. 60/370,438 filed Apr. 4, 2002; and to U.S. provisional patent application No. 60/426,071 filed Nov. 12, 2002. Each of the disclosures of No. 60/370,438 and No. 60/426,071 is incorporated herein by reference.

TECHNICAL FIELD

The present disclosure relates to filter constructions for filtering fluids, such as liquids or gases. This particular disclosure concerns: straight through flow filter elements; safety filter elements; assemblies employing such elements; precleaners; and methods for using, and assembly of, such filter elements.

BACKGROUND

Straight through flow filter elements have been used in various systems for filtering fluids such as gases or liquids. Straight through flow filter elements typically have an inlet face (or end) and an oppositely disposed outlet face (or end). During filtering, the fluid to be filtered flows in one direction upon entering the filter element at the inlet face, and has the same general direction of flow as it exits the outlet face. Typically, a straight through flow filter element is installed in a housing, for use. After a period of use, the filter element requires servicing, either through cleaning or complete replacement of the filter element. A seal is necessary between the element and a portion of the housing in which the element is placed in use, to ensure proper filtering of the fluid flow through the arrangement.

Improvements in straight through flow filter elements, their assembly and their use are desirable.

SUMMARY

According to the present disclosure a filter element is provided. The filter element in general has a straight through flow construction and comprises z-filter media. The filter element includes a seal gasket.

The current disclosure also concerns air cleaner assemblies. In general the air cleaner assembly includes a housing comprising a cover and a primary air cleaner section. A primary filter element is positioned within the housing such that an axial seal or pinch seal gasket thereon is positioned between the cover and the primary air cleaner section. In certain preferred arrangements, the cover comprises a precleaner, preferably including a plurality of cyclonic air separators therein and a dust ejector thereon.

In certain preferred embodiments the primary air filter, within the housing, has a race track shape.

The current disclosure also concerns safety elements.

Methods of assembly and use are also provided.

BRIEF DESCRIPTION OF THE DRAWINGS

FIG. 6 is an inlet end view of the primary filter element viewable in FIG. 2;

FIG. 7 is a cross-sectional view of the primary filter element of FIG. 6, the cross-section being taken along the line 7—7 of FIG. 6;

FIG. 17 depicts a side elevational view of the primary filter element and safety filter element engaged as shown in FIGS. 15 and 16;

FIG. 18 is a top plan view of the filter elements depicted in FIG. 17;

FIG. 19 is a bottom plan view of the arrangement of FIG. 17;

FIG. 21 is a side-elevational view of the primary filter element and safety filter element engaging; and FIG. 22 is a cross-sectional view of the arrangement of FIG. 21, the cross-section being taken along the line 22—22 of FIG. 21.

DETAILED DESCRIPTION

A. Overview

In general, the techniques described herein are applicable to fluid cleaners. There are generally two classes of fluid cleaners with which the techniques can be applied, namely liquid cleaners and gas cleaners. The embodiment depicted is specifically of an air cleaner (i.e., a type of gas cleaner), and thus the features will be described in this context. Applicability of the principles and techniques described to liquid cleaners or to cleaners of other gases, will be apparent from the general descriptions.

Figure 1:
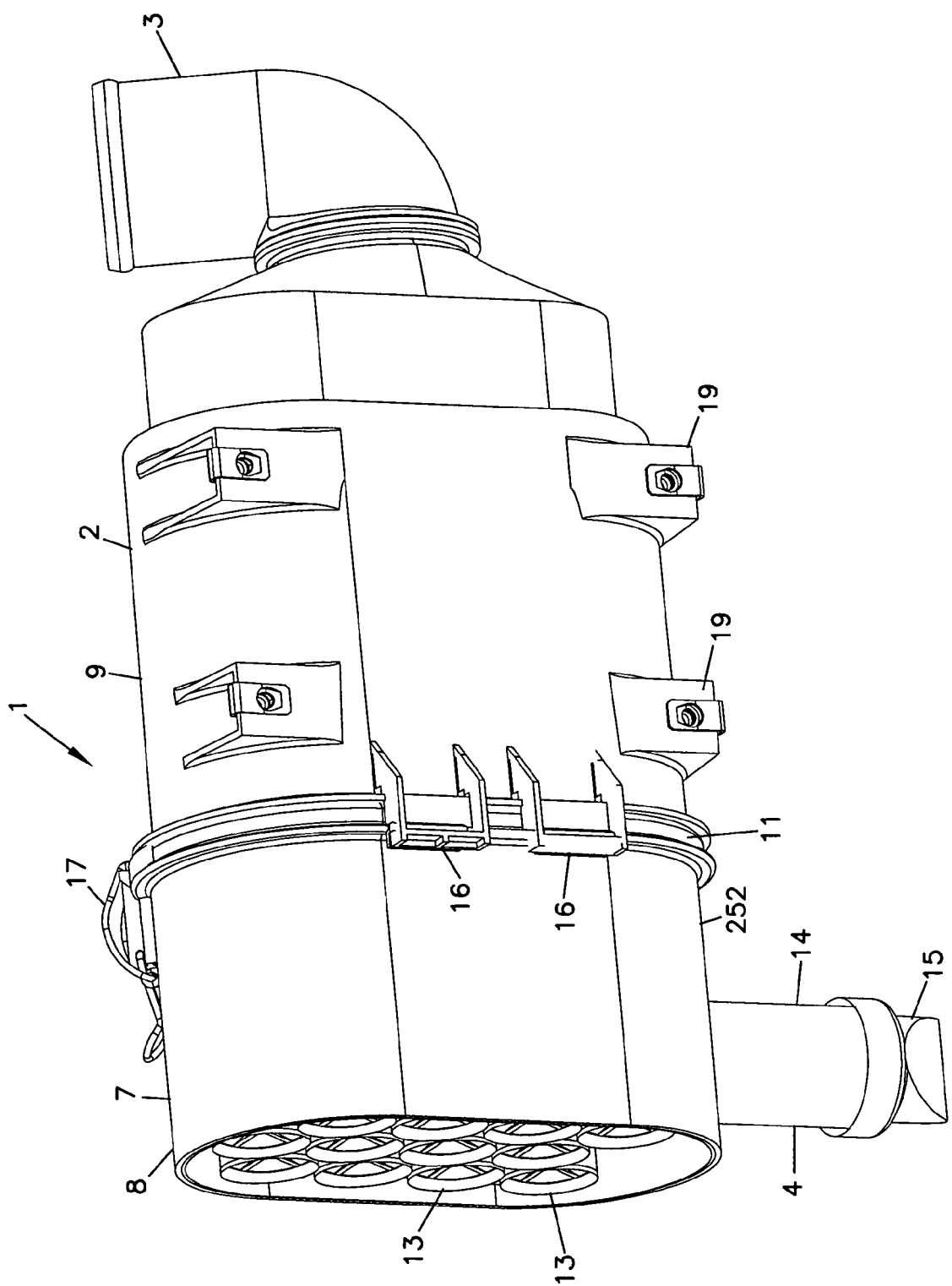
FIG. 1 is a side perspective view of an air cleaner arrangement according to the present disclosure.

Reference numeral 1, FIG. 1, indicates an air cleaner arrangement according to present disclosure. The air cleaner arrangement 1 generally comprises: a housing 2, an outlet flow duct 3, and a dust ejector 4. In general, the air cleaner arrangement 1 also includes, within the housing 2, as described below, a serviceable (primary) filter element component and an optional, serviceable safety (or secondary) filter element component. Herein the term "primary" when used to refer to a filter element, is meant to refer to a filter element which conducts majority of the filtering within the assembly. In this instance by "filtering" what is meant is removal of particulate material by passage of fluid flow through media. The term "serviceable" in this context is meant to refer to a filter element that is configured to be periodically removed and replaced. (That is, the air cleaner can be serviced by removing one element and installing another.) Safety element or secondary element helps to protect downstream components of the equipment on which the air cleaner assembly 1 is installed, in case of failure of the primary element.

Still referring to FIG. 1, in general the air cleaner 1 depicted is a preferred two-stage air cleaner having a cover 7, in this instance a precleaner section 8, and a primary air cleaner section 9. The particular housing 2 depicted is jointed between the cover 7 and the primary air cleaner section 9, at joint or region 11. At housing joint 11, the cover 7 and the primary air cleaner section 9 can be opened or separated, for access to an internally received filter element component, for servicing. This is described in greater detail below. Herein a step of pivoting, or in some instances even removing, a housing cover 7 relative to the primary filter element containing section 9, will be referred to as obtaining service access to an internally-received filter element component, or alternatively as "opening" the air cleaner 1, for example for servicing.

In general, air to be filtered enters air cleaner assembly 1 at end 12, by passage into individual cyclonic or centrifugal separators 13, in precleaner 8. Separators of the type usable at reference 13 could be conventional, and a variety of types may be used, for example those in U.S. Pat. Nos. 4,242,115 and 4,746,340, both of which are incorporated herein by reference. However, the particular precleaner 8 shown can lead to advantages. Within the separators 13, a first stage dust separation or precleaning occurs, and dust separated at this location is ejected from the precleaner 8 through dust ejector 4, in particular through ejector tube 14 and ejector valve 15. Of course, the process conducted in the precleaner 8 is not "filtering" as the term was defined above, since the dust separation in the precleaner results from a centrifugal or cyclonic process, as opposed to a process of passing the fluid through a media. The particular precleaner 8 shown is described in Section D below.

Air that is passed out of the precleaner 8, into the primary air cleaner section 9, is then passed through an internally received primary filter element, described in Section B below, through optional safety element (described in Section C below), and eventually into a clean air region for exiting through clean air outlet duct 3. From duct 3, the clean air can be directed to whatever equipment is downstream, for example an engine air intake of an internal combustion engine.

Figure 2:
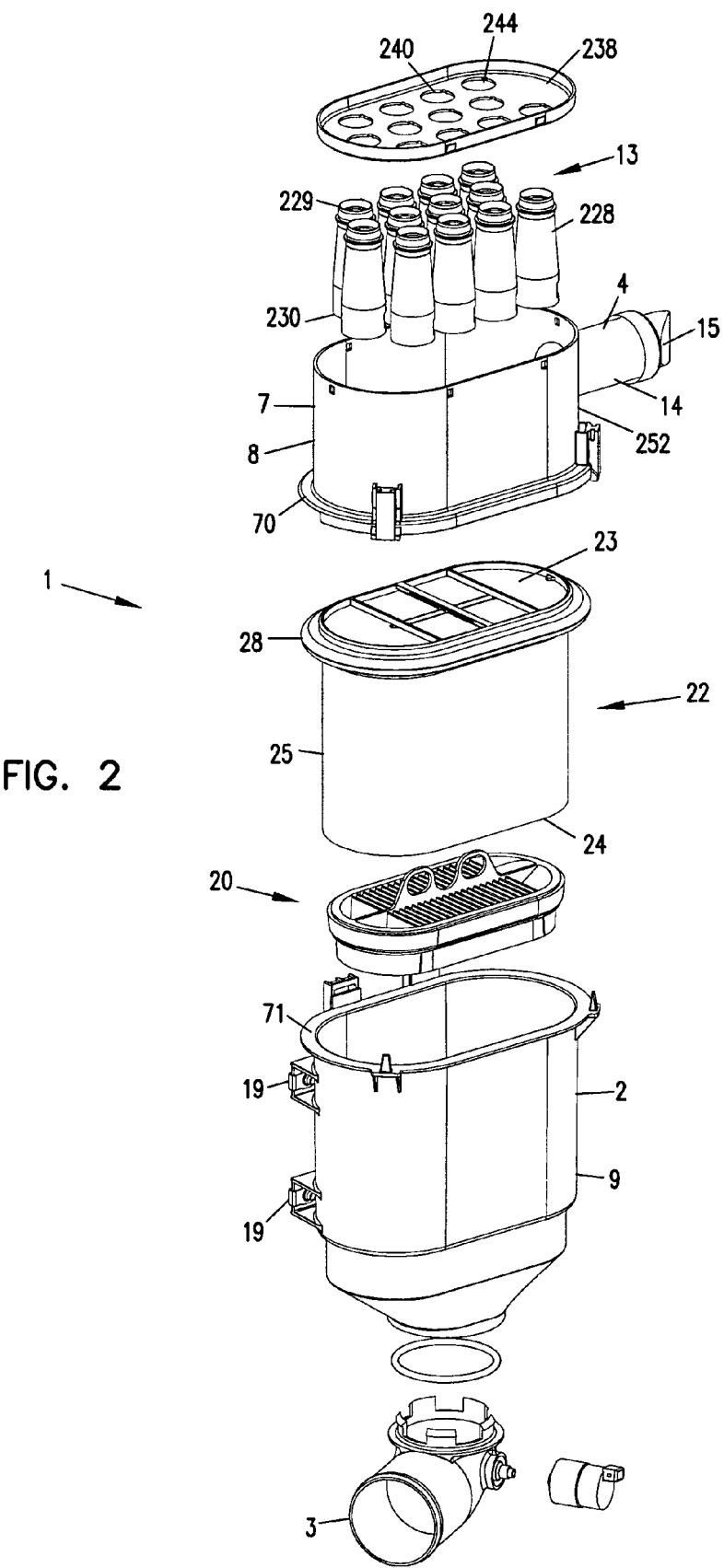
FIG. 2 is an exploded, perspective view of the air cleaner arrangement depicted in FIG. 1, the precleaner, primary filter element, and safety filter element being viewable.

Referring to FIGS. 1 and 2, in general cover 7 is pivotally secured on primary air cleaner section 9 by supports 16 and over center clamps 17. Once the over center clamps 17 are released, the cover 7 can be opened relative to the primary air cleaner section 9 of housing 2, by pivoting the cover 7 (or precleaner 8) relative to the support 16. Alternately, the system can be configured for complete separation of the cover 7 during opening.

Referring to FIG. 1, the assembly 1 can be mounted on various machinery parts by mounting pads 19, for example using bolts. In general, air cleaner 1 will be mounted with ejector tube 14 and dust ejector 15 directed generally downwardly, to facilitate dust ejection.

Figure 3:
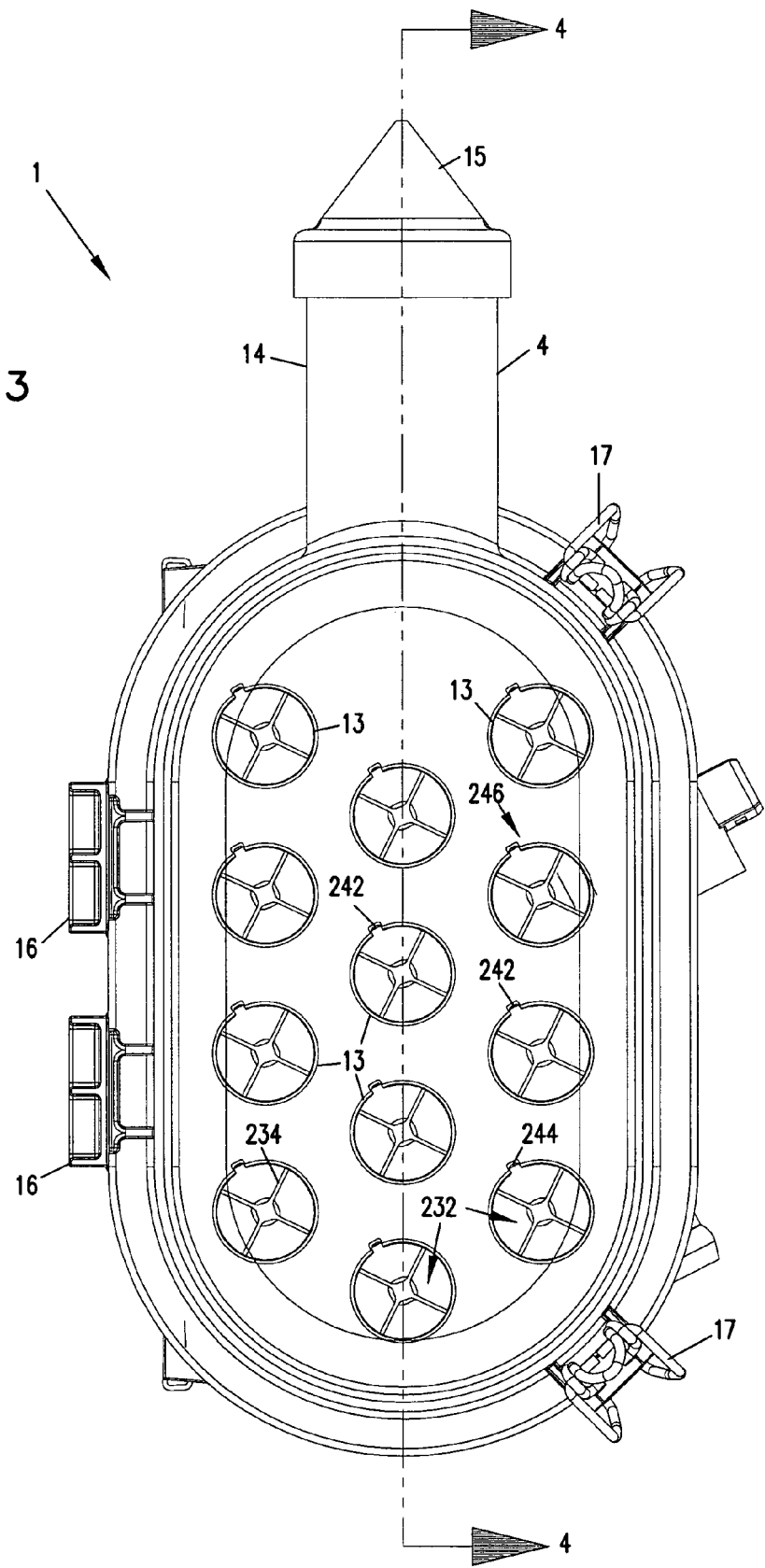
FIG. 3 is an inlet end view of the air cleaner arrangement depicted in FIG. 1.
Figure 4:
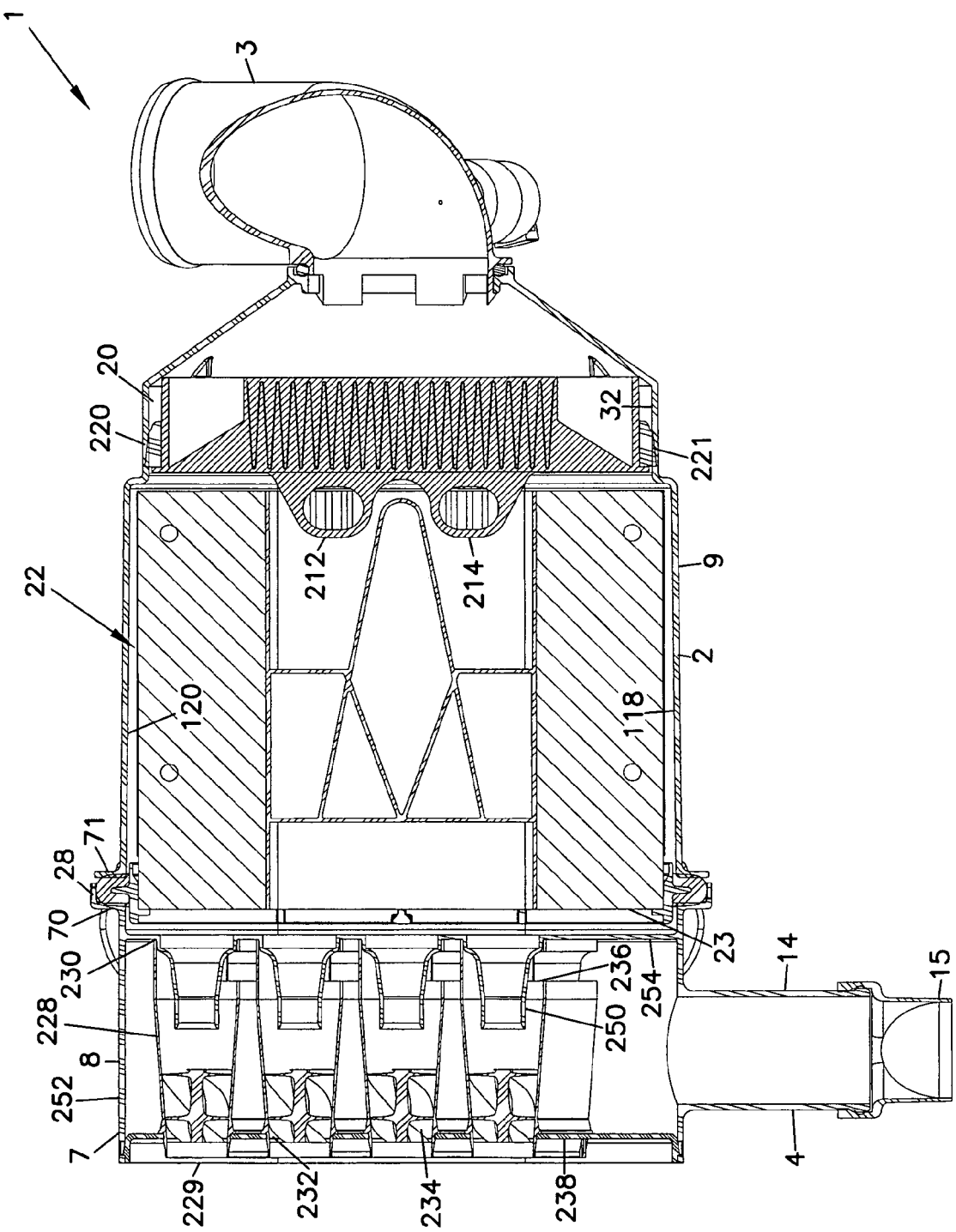
FIG. 4 is a cross-sectional view of the air cleaner arrangement depicted in FIG. 1, the cross-section being taken along the line 4—4 of FIG. 3.

Attention is now directed to FIG. 4, which is a cross-sectional view of the assembly 1 depicted from the view point of line 4—4, FIG. 3. Referring to FIG. 4, precleaner 8 is shown mounted on primary air cleaner section 9, with internally received primary filter element 22 depicted and internally received safety filter element 20 depicted.

B. Usable Primary Filter Elements

The filter element 22 is configured to permit straight through flow; that is, it has a straight through flow construction. By the term "straight through flow," in this context, it is meant that the fluids which flow to the filter element 22, for filtering, enter the filter element 22 at inlet end or face 23 in a first direction and exit from opposite outlet end or face 24 with flow in the same general direction. The term "straight through flow" as characterized above, is meant to specifically differentiate a flow in a system such as that described in WO 89/01818 published 9 Mar. 1989, in which air enters a cylindrical pleated filter member by direction against a cylindrical surface, and then exits the element (for example through an aperture) after making an approximately 90° turn.

The filter element 22 includes a filter construction having an outer sidewall or surface 25 and comprising filter media 26 that is configured to filter particulates from a gas stream entering the inlet end or face 23, such that the gas stream exiting the outlet end or face 24 is at least partially clean (i.e., free of particulates). As can also be seen from FIG. 2, the filter element 22 also includes a gasket or seal member 28 which aids in inhibiting leakage between the filter element 22 and portions of the housing 2 in which the filter element 22 is installed. The preferred gasket 28 extends completely, peripherally, around the outer sidewall 25 of the straight through flow construction or element 22.

Preferred filter media 26 usable in the primary element 22 of air cleaner arrangement 1 is a type of media, described below, generally referred to as "z-media" or "z-filter media." Z-filter media generally comprises a corrugated or pleated media sheet secured to a non-corrugated facing sheet. The media is arranged to form a set of longitudinal flutes or air flow channels on one side of the corrugated or fluted media, and another set of flow channels on an opposite side of the media. In operation, flutes of one set of flutes are designated as inlet flutes, are left open at an inlet end or side of the media, and are sealed or otherwise folded closed at an outlet end or side of the media. Analogously, the flutes of a second set of flutes are generally designated as outlet flutes, are sealed or otherwise closed at the outlet end or side of the filter, and are left open at the outlet end or side of the filter. In operation, air passes into one flow face of the air filter construction, by passage into the open inlet flutes at an upstream end of the element. The air cannot flow out of the closed ends of these inlet flutes, so it must pass through the filter media into the outlet flutes. The filtered air then passes outwardly from an exit end of the filter element, through the open ends of the outlet flutes.

A variety of shapes, i.e., outer perimeter configurations, for the primary filter element 22 can be used. The particular one used the arrangement of the drawings, is an "obround" or "race track" shape. Its definition will be understood by reference to FIG. 6, which depicts the element. Referring to FIG. 6, the shape has first and second opposite, generally parallel, straight sections 38, 39, with opposite rounded (typically semicircular) end sections 40, 41. Alternative configurations include, for example, oval and circular.

Figure 5:
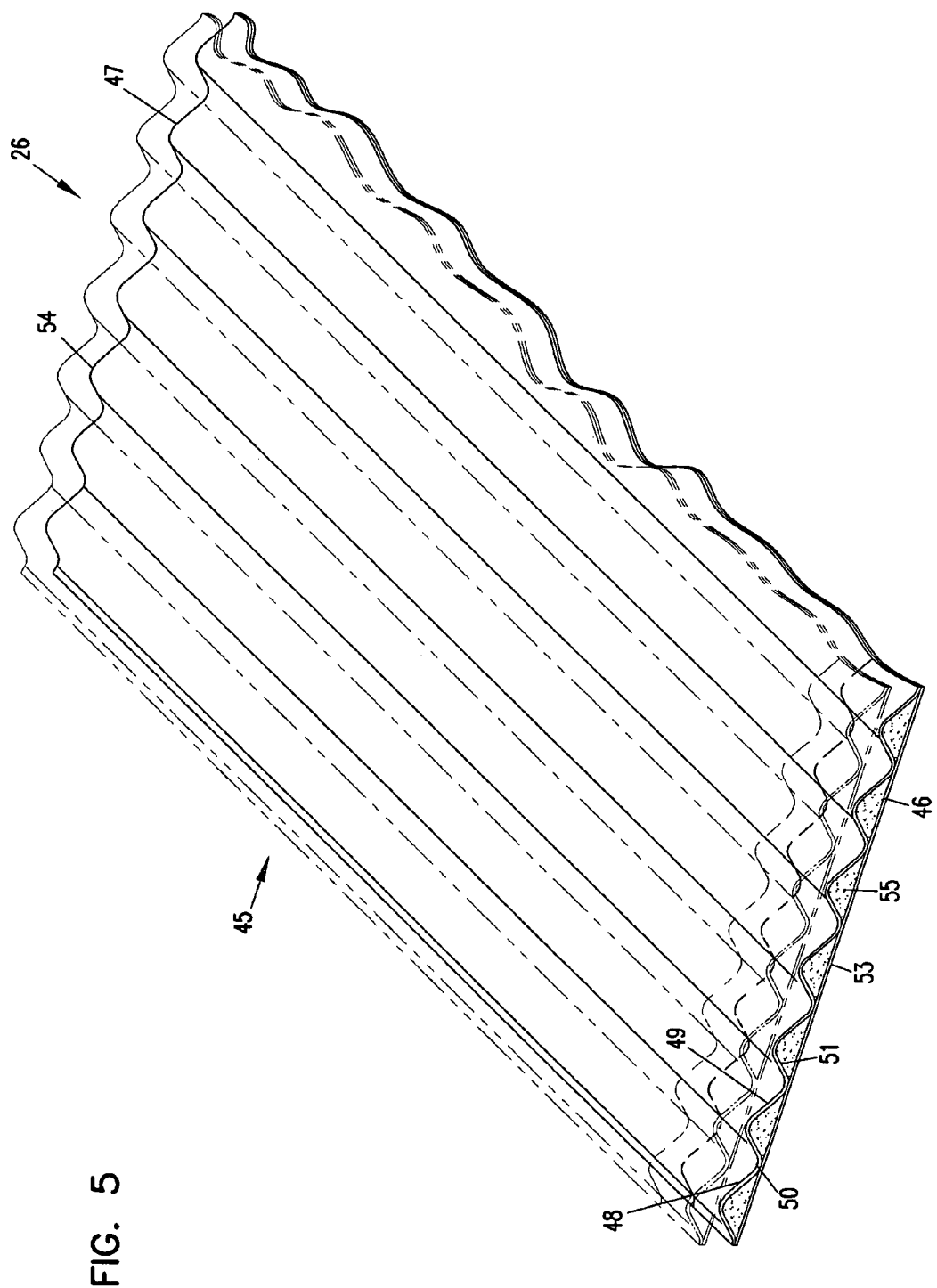
FIG. 5 is a schematic, perspective view of Z-media, a type of media usable in the primary filter element, according to the present disclosure.

Referring to FIG. 5, in general, the filter media 26 is a coiled two-layered construction 45, formed from a flat (non-corrugated) sheet 46 secured to a corrugated sheet 47. In general, on one side 48 of the corrugated sheet 47 a first set of flutes 49 is formed; and on an opposite second side 50, a second set of flutes 51 is formed. In FIG. 5, edge 53 would correspond to inlet face 23, FIG. 2; and, edge 54 would correspond to outlet face 24, FIG. 2. The phantom lines in FIG. 5, indicate where and how the two-layered construction 45 has come back around itself, as a result of the coiling; the solid lines being an outer layer of the two layers depicted. In alternate embodiments, the filter media can be a stacked construction instead of coiled. Stacked constructions include a plurality of: a flat sheet 46 secured to a corrugated sheet 47 stacked on top of each other.

The first set of flutes 49 would be sealed adjacent edge 54 by a sealant bead, or similar structure, not shown. The second set of flutes 51 is sealed adjacent to the first edge 53 by sealant bead 55, as indicated.

From review of FIGS. 2 and 5, it should be apparent how the media 26 functions. In general the first set of flutes 49 are open at inlet face 23, and thus comprise inlet flutes. They would be closed at their exit ends 54, as a result of a sealant bead or similar closure at this location. Thus air which enters flutes 49 at the inlet edge 53 must pass through the media 26 to escape from the inlet flutes 49. Upon passage through the media, filtering occurs and fluid flow enters a second set of (outlet) flutes 51, at a location downstream from the sealant 53. Outlet flutes 51 are open along edge 54, and thus the filtered fluid stream can flow out of the media 26. This type of construction is generally characterized herein as z-filter media. The z-filter media can include a plurality of flutes; each having an upstream portion adjacent to an inlet flow face and a downstream portion adjacent to an outlet flow face; selected ones of the flutes being open at the upstream portion and closed at the downstream portion; and selected ones of the flutes being closed at the upstream portion and open at the downstream portion.

A variety of corrugation shapes and sizes can be utilized in the filter media 26. Examples include: corrugations resulting in straight flutes, in which the flutes are parallel to each other and do not change shape from one end to other; straight flutes having crushed or pinched ends; and tapered flutes, in which inlet flutes gradually converge from a wide end in direction to a narrow end with adjacent exit flutes diverging from a narrow end to a wide end, in the same direction. Various z-filter media configurations are described in the following references:

1. Standard flutes are depicted in U.S. Pat. No. 5,820,646; and U.S. Pat. No. 5,895,574.
2. Tapered flutes, flutes with crashed ends and other variations in flute shapes are described in WO 97/40918, published Nov. 6, 1997.

The above references (i.e., U.S. Pat. Nos. 5,820,646; 5,895,524 and WO 97/40918) are incorporated herein by reference.

Referring again to FIG. 2, the (primary) filter element 22 is serviceable. By the term "serviceable" in this context, it is meant that the filter element 22 can be removed from the air cleaner assembly 1, and either be refurbished or replaced. In typical systems, the filter element 22 is periodically replaced, during a servicing operation, by installation of a new element.

In general, the filter element 22, FIG. 7 comprises three components: the main body or straight through flow construction 55, primarily comprising media 26; a centerpiece, core 57, or other framework structure attached to the media 26; and, seal or gasket member 28. The seal member 28 is generally positioned to completely circumscribe the main body or construction 55, preferably adjacent to, i.e., within 10 mm of and preferably within 5 mm of, inlet face 23.

Figure 15:
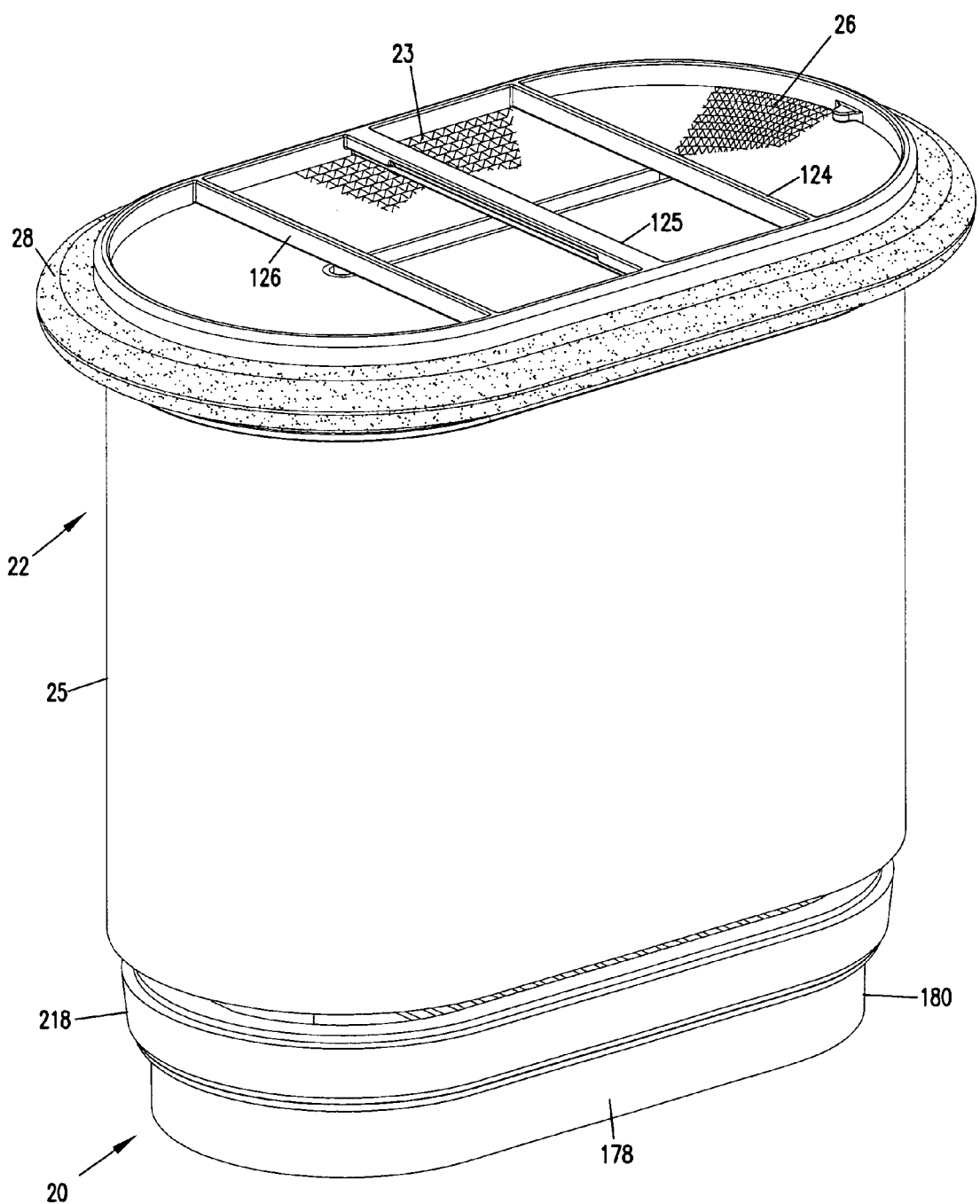
FIG. 15 is a perspective view of the primary filter element and safety filter element while engaged with each other.
Figure 16:
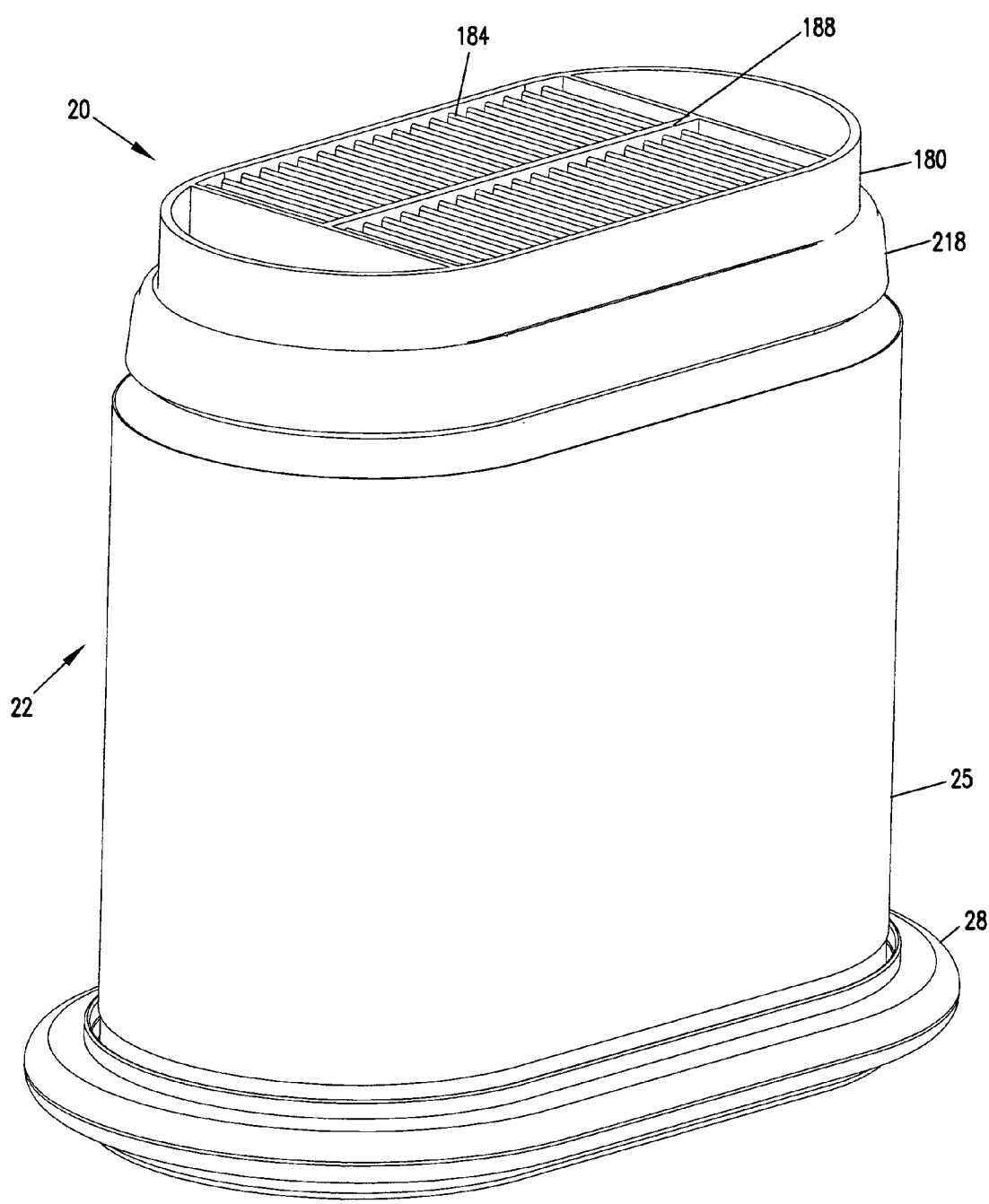
FIG. 16 is a perspective view showing the primary filter element and safety filter element engaged with each other, from an opposite perspective from that of FIG. 15.

It is noted that in the figures, the main body or straight through flow construction 55 of the filter element 22 is shown schematically, in the cross sections. That is, flute detail is not depicted. As to flute detail, it is not shown in any figures other than the example of FIG. 5 and a portion of FIG. 15, for convenience. As indicated previously, a variety of flute shapes can be used. Examples depicting the ends of a z-filter element, and sealing at those ends, are provided in the drawings of U.S. Pat. No. Des. 396,098; U.S. Pat. No. 6,190,432; U.S. Pat. No. Des. D450,827; U.S. Pat. No. 6,235,195; U.S. Pat. No. D437,402 and U.S. Pat. No. D450,828, all 6 of these references being incorporated herein by reference.

Still referring to FIG. 7, in general the main body (or straight through flow construction) 55 of the filter element 22 has an outer surface 56 which generally either comprises a portion of the flat (i.e., non-corrugated) sheet 46 used to form the coiled construction 45; or, some outer sheet or cover placed around the media 26.

Referring still to FIG. 7, the seal member or pinch seal or axial seal gasket 28, shown in cross-section, includes the following features: mounting aperture 60 (FIG. 8); and, axial seal region 61 (FIG. 7). The mounting aperture 60 includes inner pocket 63, by which the seal member 28 is secured to framework 58.

Figure 8:
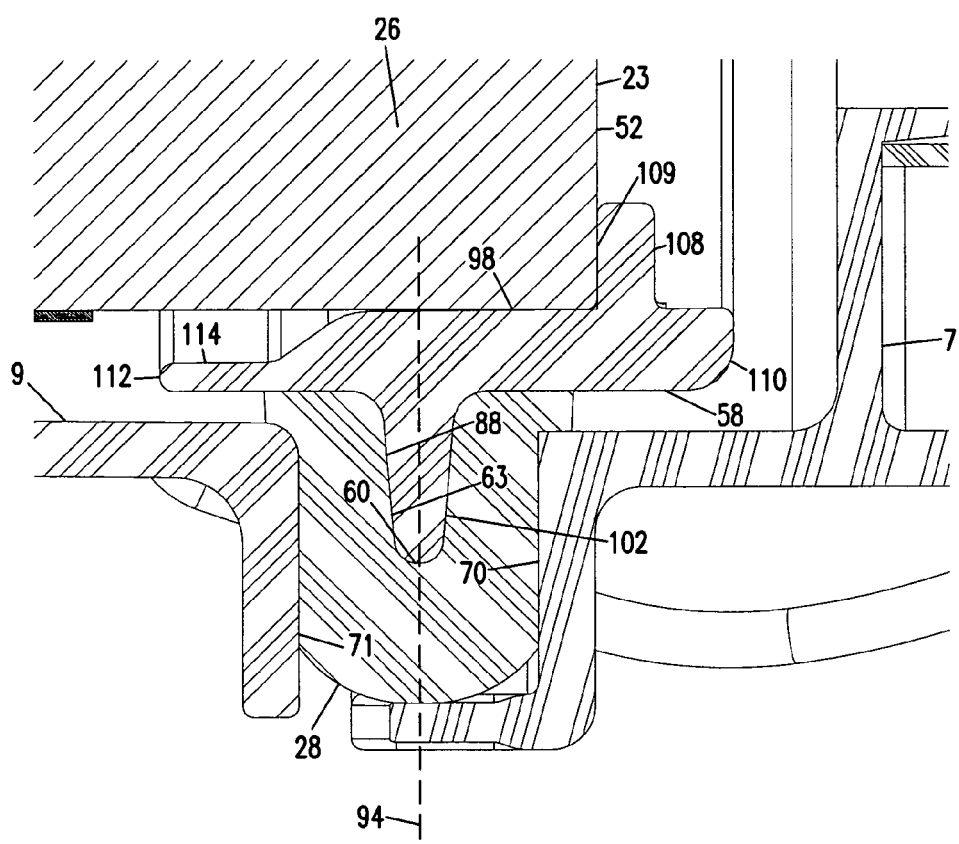
FIG. 8 is an enlarged fragmentary view showing an interaction between a gasket member mounted on the primary filter element and structural members on certain housing components.

The axial seal region 61 is positioned to be compressed axially between two housing portions. For the particular air cleaner assembly 1 depicted, these two housing portions comprise cover 7 and primary air cleaner section 9. Referring to FIG. 8, in particular, the compression occurs between peripheral end flange 70 on precleaner 8; and peripheral end flange 71 on primary air filter cleaner section 9. The compression of the seal member 28 at this location is referenced as "axial" because of the direction of compression. In this context, the terms "axial," "axial direction of compression" and variants thereof, are meant to refer to a compression that occurs as a result of compressive forces directed in the same direction as a direction directly from the inlet face 23 to the outlet face 24.

Referring now to FIG. 7, axial seal member 28 generally includes first and second opposite sides 75, 76 and outer annular surface 77. Also preferably, referring to FIG. 8, gasket 20 includes the mounting aperture 60. The aperture 60 includes the pocket 63. The pocket 63 receives part of the framework 58 to secure the gasket 28 to the main body 52. In the embodiment depicted in FIG. 8, the pocket 63 includes a channel 88. The channel 88, in the embodiment shown, is bisected by the center axis 94 of the gasket 28. As such, in the preferred embodiment, the gasket 28 is symmetrical about the axis 94, including being symmetrical about the center of the channel 88. The pocket 63 allows for the gasket 28 to be secured to and "locked" to the framework 58.

Referring now to FIGS. 6–8, one embodiment of the framework 58 is depicted. In the embodiment shown, the framework 58 includes a frame member 96 that functions to secure the gasket 28 to the main body 52. The frame member 96 includes a band 98 (FIG. 8) forming a ring 100 (FIG. 6) that extends completely, peripherally, around the main body 52. Extending from the frame member 96 is a projection 102 (FIG. 8). The projection 102 preferably extends completely, peripherally around the straight through flow construction 52. The projection 102 receives the gasket 28. In particular, the projection 102 extends into and is received in a "snugged fashion" by the pocket 63.

Still in reference to FIG. 8, the frame member 96 includes a lip 108 extending radially inwardly from the band 98. The lip 108 hooks over the outer peripheral edge 109 of the main body 52. As such, the lip 108 is an extension over at least a portion of the inlet end 23 of the filter element 22. The lip 108 helps to secure the frame member 96 to the main body 52. The lip 108 is on one end 110 of the band 98.

On an opposite end 112 of the band 98, the band 98 includes a tapered section 114. The tapered section 114 helps to allow for ease of assembly of securing the frame member 96 to the main body 52. In particular, in preferred embodiments, during assembly, the gasket 28 will be secured to the frame member 96 by pressing the gasket ring 28 on to the frame member 96. This is done by pressing the pocket 63 of the gasket 28 over the projection 102, until the gasket 28 is operably mounted onto the frame member 96. Typically, the gasket ring 116 will stretch somewhat to be fitted over the frame member 96, and once properly seated onto the projection 102, will be in tension to be tightly secured to the frame member 96.

The combination gasket 28 and frame member 96 is then mounted onto the main body 52. This is done by placing the frame member 96 over the inlet end 23. The tapered section 114 allows this gasket 28/frame member 96 combination to be mounted over the main body 52 without damaging the inlet end 23. The tapered section 114 helps to seat the frame member 96 in place over the inlet end 23.

Preferably, the frame member 96 is secured to the main body 52 with an adhesive between the band 98 and the outer surface 56 of the main body 52. The tapered section 114 also helps to hold any excess adhesive when mounting the band 98 onto the main body 52. This helps to minimize any unsightly appearance of excess glue being squeezed out from between the band 98 and the main body 52.

Still in reference to FIGS. 6 and 7, the preferred frame member 96 also includes a cross-brace construction 122. The cross-brace construction 122 helps to provide structural integrity and overall strength to the filter element 22 in the region of the gasket member 28. It also can help to prevent "telescoping" of the filter media 26. Telescoping could occur when the media is coiled by having adjacent layers extend out further over other layers. The cross-brace construction 122 can help to prevent such telescoping. In the particular embodiment shown, the cross-brace construction 122 includes three braces 124, 125, 126 in extension from the lip 108 and extending over the inlet end 23. The cross-brace construction 122, in combination with the other features, also contributes to an attractive, ornamental appearance.

It is anticipated that such a configuration for gasket 28, can be used with a variety of sizes of elements 22. Typical arrangements will be elements on the order of 10 cm to 60 cm long (in dimension between inner surface 23 and outer surface 24), and 10 cm to 50 cm wide (diameter if circular; longest dimension if race track, obround or oval).

1. Alternate Embodiment of Gasket and Frame Member

Figure 10:
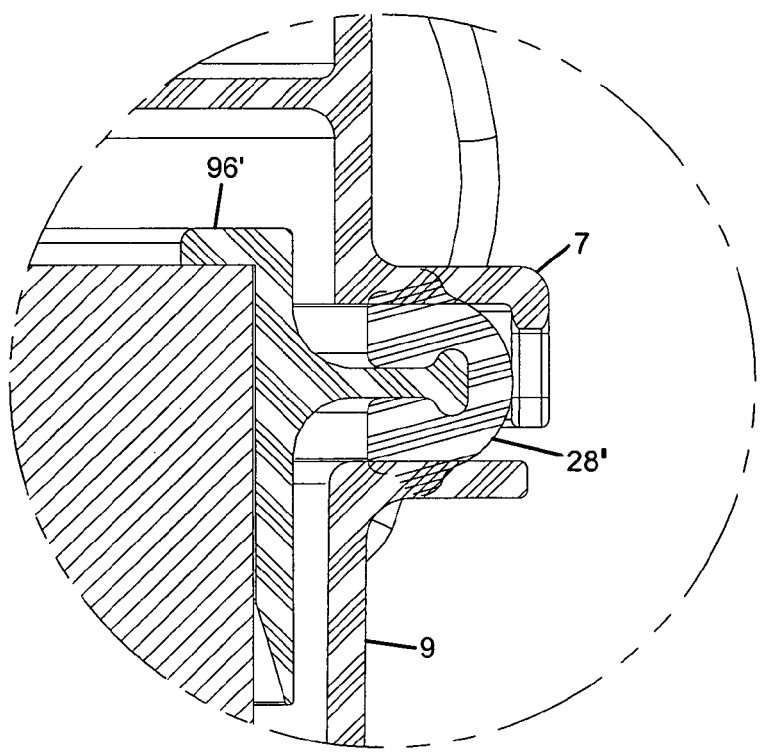
FIG. 10 is an enlarged, fragmentary view analogous to the view shown in FIG. 8, but depicting the alternate gasket arrangement shown in FIG. 9.
Figure 9:
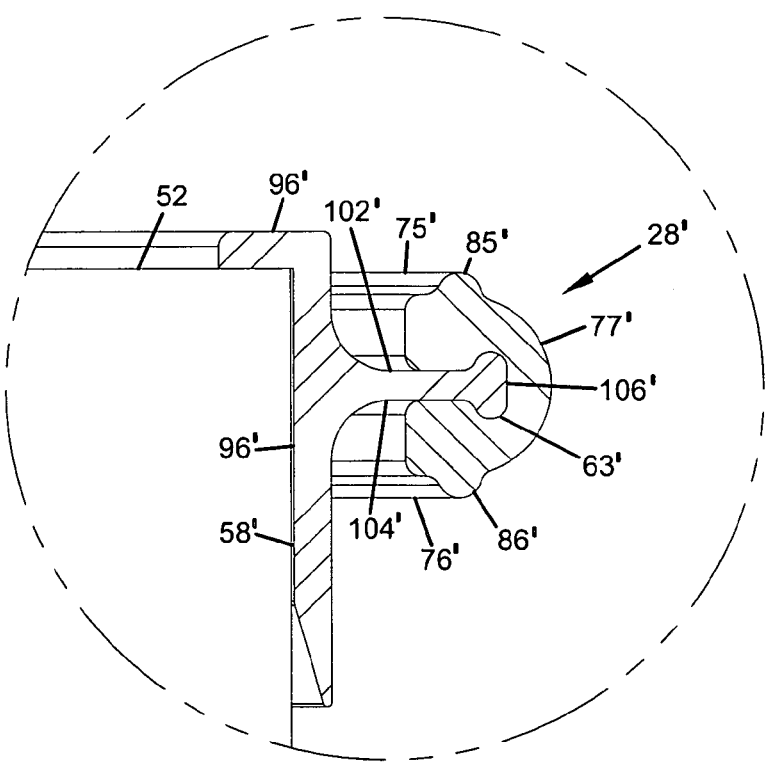
FIG. 9 is a fragmentary, cross-sectional view of an alternate embodiment of a gasket member usable herein.

Referring now to FIGS. 9 and 10, an alternate axial seal member 28' is depicted. Seal member 28' generally includes first and second opposite sides 75', 76' and outer annular surface 77'. Preferably the configuration of the gasket 28' is such that on each side 75', 76' there is a corresponding projection, knob, or rib 85', 86' formed. Preferably each of ribs 85', 86' is continuous, i.e., extends continuously around the straight through flow construction 52.

The projection 102' on the framework 58', in preferred embodiments, has a shape that corresponds to the shape of the pocket 63'. As such, the projection 102' includes a stem 104' and ahead 106'.

The gasket 28' will be secured to the frame member 96' by pressing the gasket 28' on to the frame member 96'. This is done by pressing the pocket 63' of the gasket 28' over the projection 102', until the gasket 28' is operably mounted onto the frame member 96'. Typically, the gasket 28' will stretch somewhat to be fitted over the frame member 96', and once properly seated onto the projection 102', will be in tension to be tightly secured to the frame member 96'.

A number of advantages result from utilizing gasket arrangements 28 and 28' such as those described above. For example:

1. Because the gasket 28 is located at adjacent inlet end 23, region 118, FIG. 4, i.e. the space between the element 22 and housing 9 is a clean air region. This means dust will not collect in this region, to advantage. The result for example is not likely to have significant dust contamination in the clean air region 32, during cleaning.

2. Because gasket 28 is axial, there is no need to provide a substantial dimension of extension of the gasket between the element body 52 and the inside surface 120 of housing 9, FIG. 4. This means that the dimension of spacing in region 118 between the wall 10 and the body 52 can be relatively small, the order of 10 mm or less, typically 6 mm or less, preferably 2 mm or less.

A variety of materials for the filter media 26 are possible. One usable media 26 comprises cellulose media with the following properties: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); Frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. If fine fiber is used, one application would be to apply enough fine fiber until the resulting media construction has the following properties: initial efficiency of 99.5% average, with no individual test below 90%, tested according to SAE J726C, using SAE fine dust; and an overall efficiency of 99.98% average, according to SAE J726C.

2. Core Construction

In reference now to FIGS. 6, 7, 20, and 22, a usable core construction 57 is shown. The core construction 57 is utilized to support the media 26 and to help provide the desired resulting outer shape for the primary element 22. As will be explained below, the filter media 26 can be configured to define a receiving socket 130 to help center the filter element 22 when orienting the element 22 in the air cleaner 9. The receiving socket 130 defined by the media 26 in the primary element 22 can be used to align with a projection extending from the interior of the air cleaner housing 2. In particular preferred embodiments, the projection will be part of the safety element 20. This is explained further below, in Section C(2).

A variety of core constructions 57 are usable. The particular one illustrated can be used to advantage. In the core construction 57 that is shown, the core construction 57 is usable to help support the receiving socket 130. In particular, in the one depicted, the core construction 57 includes a non-cylindrical member 132. In FIG. 22, the member 132 includes at least one region of opposing walls 134, 135 defining an open volume 136 therebetween. The open volume 136 functions as an open receiver 138. In the preferred configuration shown, the receiver 138 aligns and supports the receiving socket 130 defined by the media 26. In the one shown, each of the receiving socket 130 and the receiver 138 is non-cylindrical. By the term "non-cylindrical", it is meant that the cross-section does not form a circle. Rather, the cross-section is non-circular. In the preferred embodiment shown, the cross-section of the receiving socket 130 and the receiver 138 is elongated, with the opposing walls 134, 135 defining a gap of not more than 20 mm., at least greater than 2 mm., and typically 3–12 mm. therebetween. The opposing walls 134, 135 are joined by curved ends 140, 141, as can be seen in FIG. 6.

The core construction 57 illustrated includes structural molding 144 (FIG. 7) for providing strength. The preferred embodiment also includes a molded plug 148 to ensure that fluid to be filtered cannot leak by passage between the walls 134, 135 of the core 57. The molding 144 further includes, in the particular preferred embodiment illustrated, centering structure 150. In the embodiment illustrated in FIG. 7, the centering structure 150 has an apex 152 that is located about midway between the ends 140, 141 of the core construction 57. The centering structure 150 will interact with projections in the housing 2 to help align and center the filter element 22 when installing the element into the air cleaner 1.

In the preferred embodiment, the centering structure 150 divides the receiver 138 into first and second receiving pockets 164, 166. The receiving pockets 164, 166, in the preferred embodiment, each receive a projection to assist with centering and properly aligning the primary element 22 in operable orientation in the air cleaner 1.

In many usable embodiments, the distance between the ends 140, 141 of the core construction 57 is not greater than 24 cm., at least 5 cm., and typically 7–15 cm.

Preferred core constructions 57 can also include at least one corrugated region 154 (FIG. 20) molded as part of the wall 134. The corrugated region 154 includes at least one, and preferably 2–10 corrugations 156 that match the corrugation of the corrugated sheet 47 of the media 26 (FIG. 5). Preferred core constructions 57 include two corrugated regions 154, 158. The second corrugated region 158 also includes at least two corrugations 159. The corrugated regions 154, 158 assist in manufacturing of a coiled construction, resulting in the primary element 22. To make the coiled construction, the corrugated side of the filter media 26 is aligned with the corrugated regions 154, 158. The media 26 is then wound around or coiled around the core construction 57. The media 26 is secured to the core construction by using, for example, an adhesive bead at regions 160, 161 between the core constructions 57 and the media 26.

In some embodiments, the primary filter element 22 is covered by an outer protective wrap covering the outer sidewall 25

One eye-catching, distinctive filter element 22 that is usable herein is depicted in commonly assigned U.S. design patent application filed on Apr. 2, 2003, carrying attorney docket 758.1520US01; entitled FILTER ELEMENT; Express Mail No. EV 143555756 US; incorporated by reference herein.

C. Usable Safety Elements

1. Example Embodiment, FIGS. 11–14

In reference now to FIGS. 11–14, an embodiment of a usable safety element 20 is illustrated. In preferred systems, the safety element 20 is oriented in the air cleaner 1 downstream of the primary filter element 22 in order to protect downstream components from debris that could get passed the primary filter element 22, in case of failure of the primary filter element 22. In addition, the safety element 20 helps to protect the engine while servicing the air cleaner 1 while preventing debris from falling into the clean air region 32.

The safety filter element 20 has an outside periphery 170 that preferably matches the outside periphery of the primary filter element 22. In the embodiment illustrated, the safety element 20 is obround or racetrack shaped, but can be other shapes such as circular. The racetrack shape of the safety element 20 includes a pair of straight sides 172, 173, joined by a pair of rounded or curved ends 174, 175.

Figure 11:
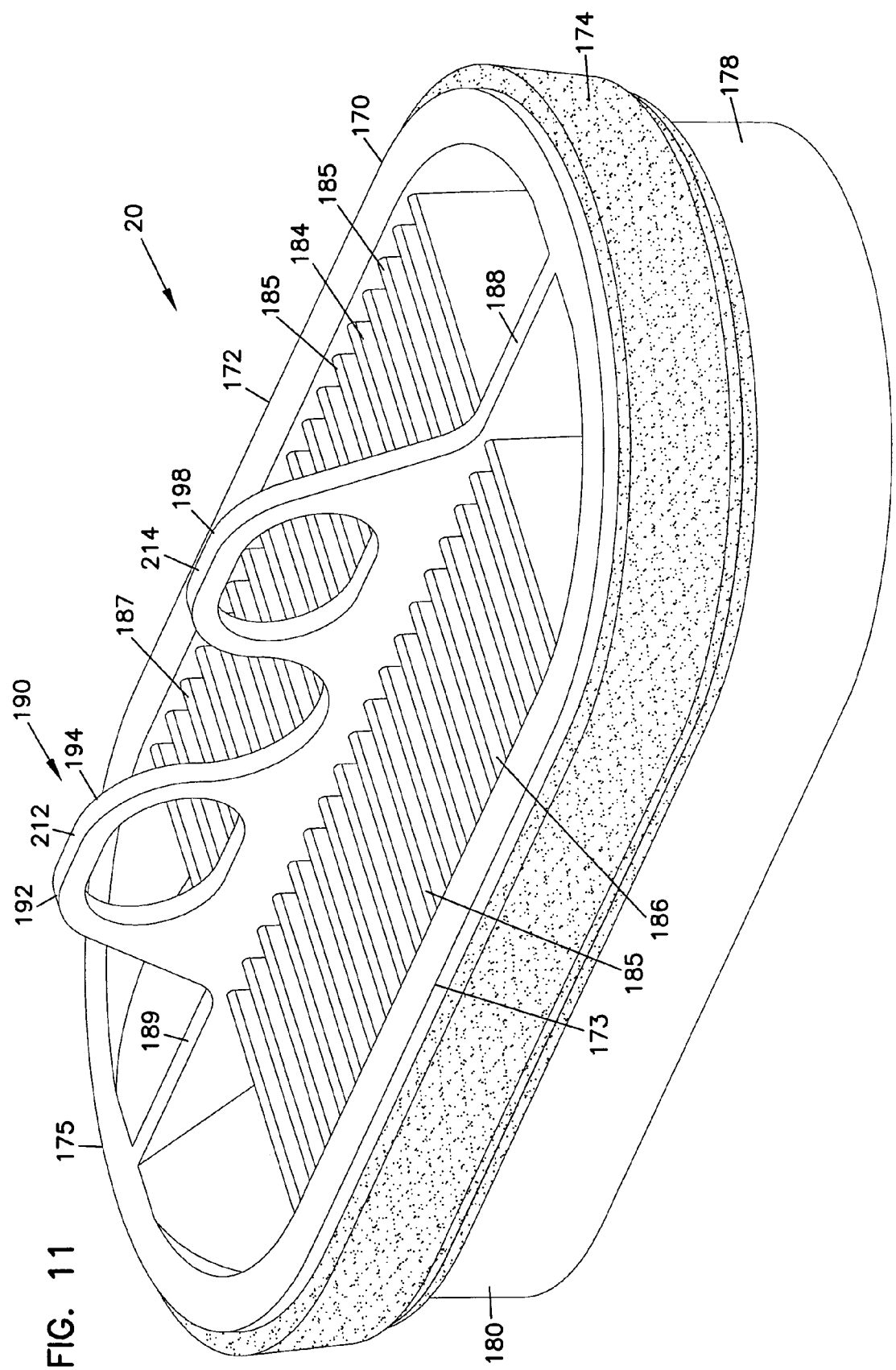
FIG. 11 is a perspective view of a safety filter element usable in the air cleaner arrangement depicted in FIG. 2.
Figure 12:
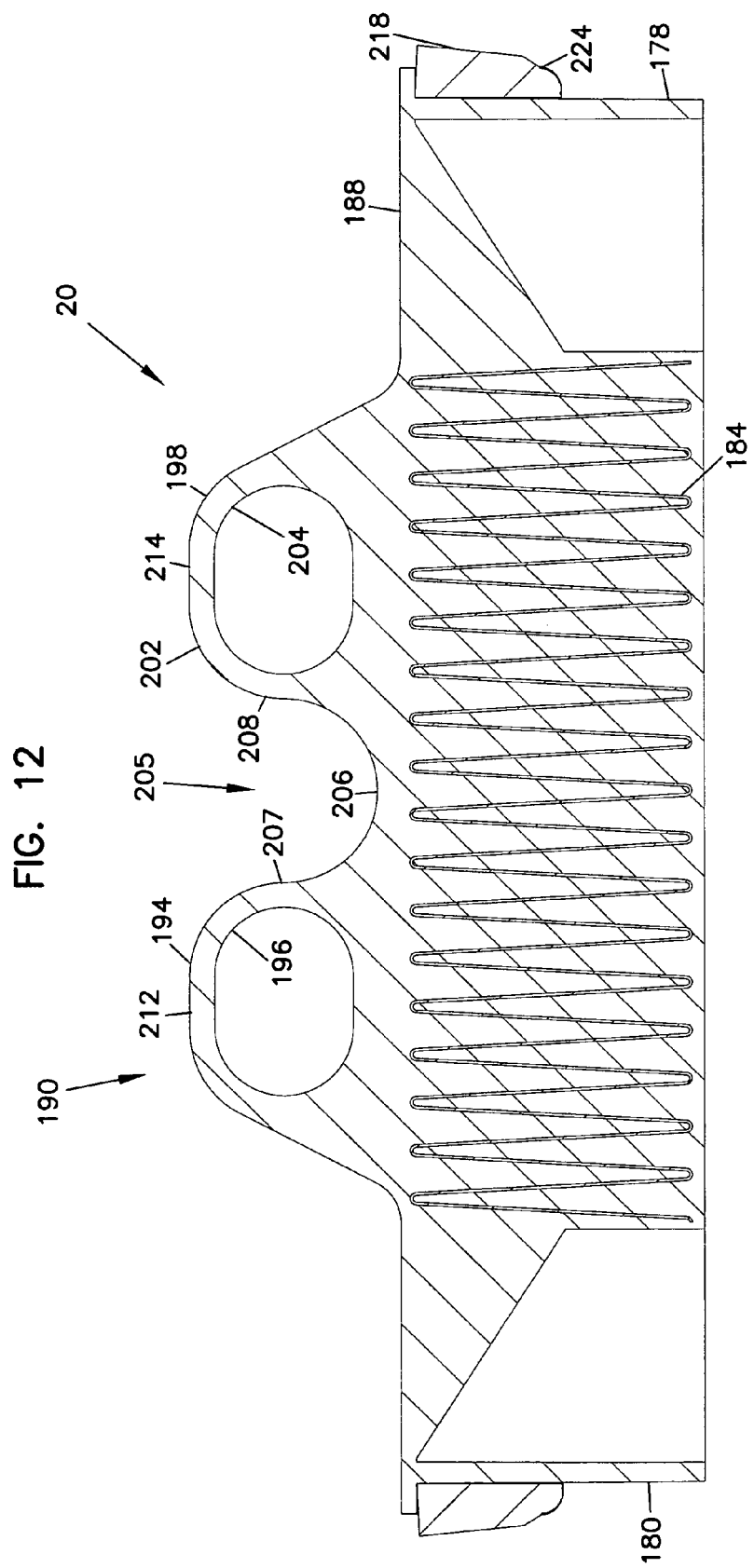
FIG. 12 is a longitudinal cross-sectional view of the safety filter element depicted in FIG. 11.
Figure 13:
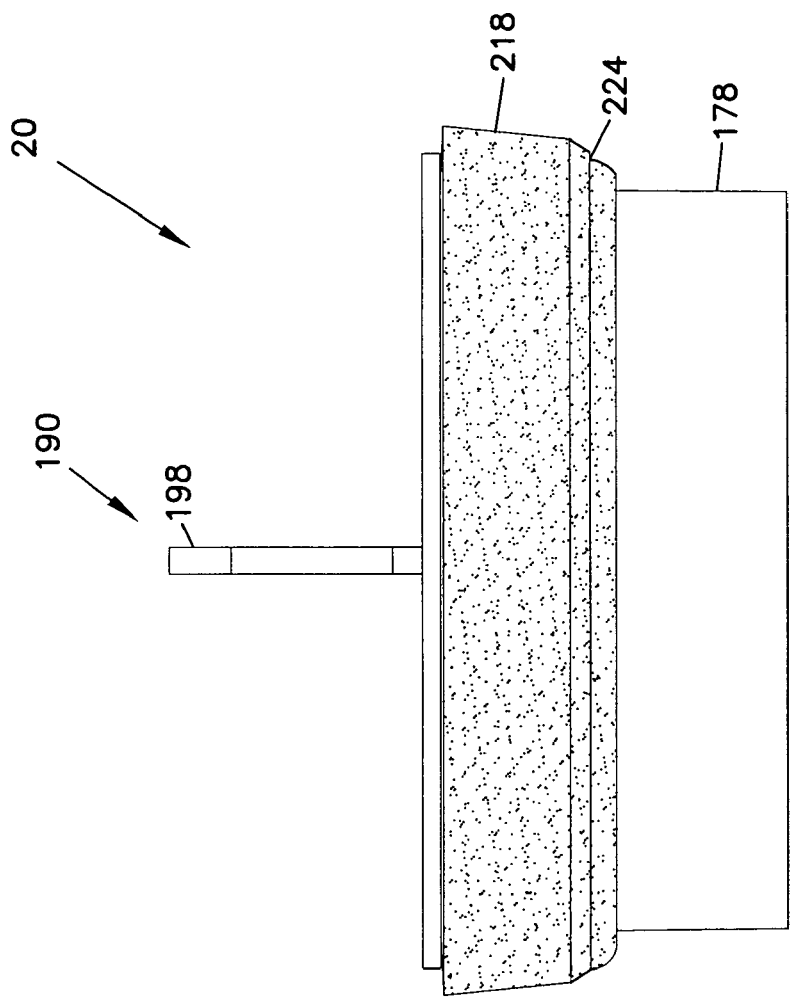
FIG. 13 is an end view of the safety filter element of FIG. 11.
Figure 14:
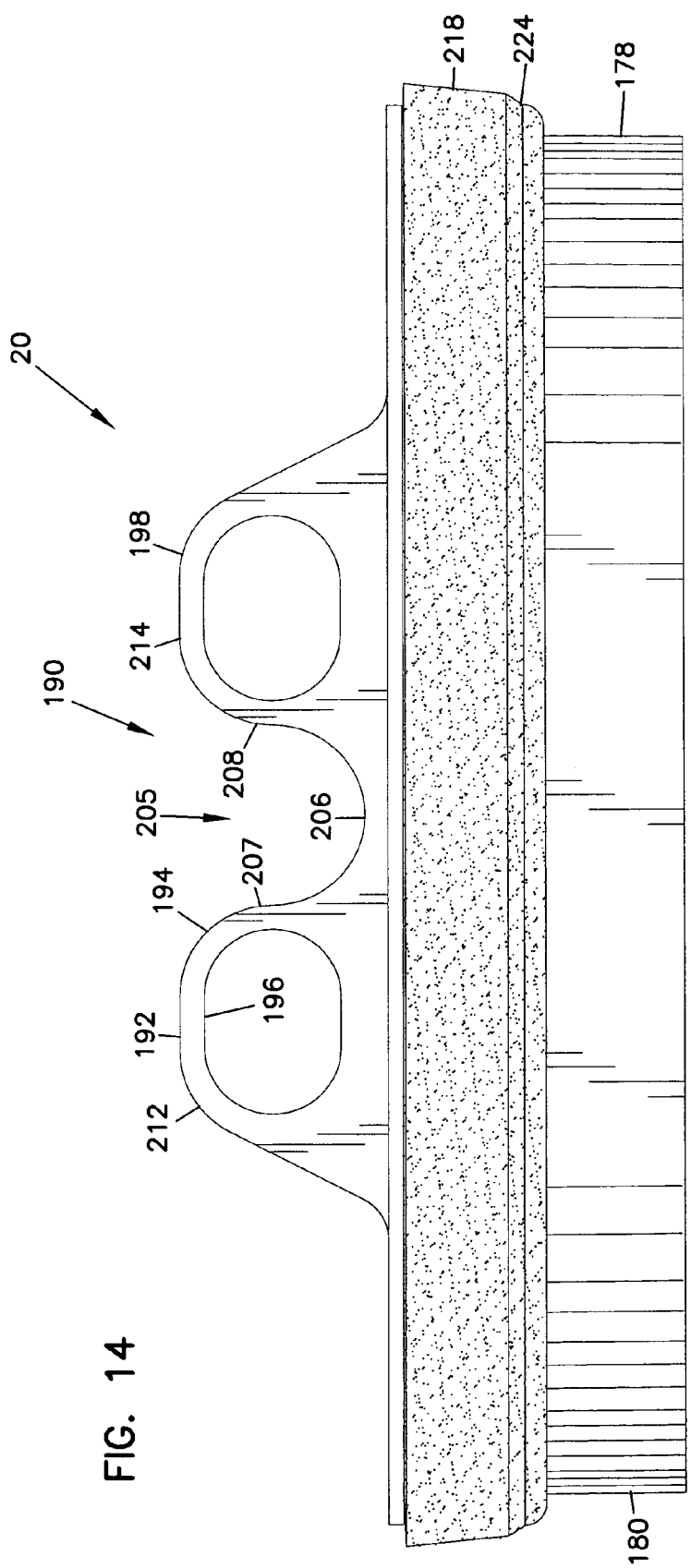
FIG. 14 is a side elevational view of the safety filter element depicted in FIG. 11.

In the illustrated embodiment, the safety element 20 includes a rigid, structural frame 178. Forming a portion of the frame 178 is a skirt or band 180. The band 180 circumscribes an internal region of filter media 184. A variety of types of media 184 can be utilized. In the configuration shown, the media 184 is pleated, with the pleats 185 extending between the straight sides 172, 173. Usable configurations include at least 10 pleats, no greater than 50 pleats, and typically 15–30 pleats. This can correspond to pleat densities of at least two pleats per inch, and typically 3–8 pleats per inch. In FIG. 11, it can be seen how there are two regions of pleats 186, 187. The first pleat region 186 is separated from the second pleat region 187 by a partition 188 of the frame 178 that generally bisects the safety element 20. The bisecting wall 188 extends longitudinally along the safety filter element between curved end 174 and curved end 175.

In the preferred embodiment, the safety filter element 20 includes a handle 190 that is sized to accommodate at least a portion of a human hand. By "sized to accommodate a portion of a human hand", it is meant that the handle 190 has structure between it and the remaining portion of the safety element 20 that allows at least a part of hand (a finger or fingers) to fit between the handle structure and the remaining portion of the safety element 20 to allow for manipulation of the safety filter element 20.

In the embodiment shown, the safety filter element 20 includes the handle 190 projecting from the frame 178. In preferred embodiments, the handle 190 is an integral extension of the partition 188. A variety of handle constructions 190 are usable. In the one shown, the handle 190 has at least one projection 192 extending from the frame member 189. The projection 192 can take various configurations, including knobs, rings, extensions, etc. In the one shown, the projection 192 takes the form of an arm 194 defining a void 196. In preferred embodiments, the void 196 goes completely through the arm 194.

In particular preferred embodiments, the handle 190 includes a second projection 198. The second projection 198 can also take a variety of shapes or configurations. In the one shown, the projection 198 has the same shape as projection 192, in the form of an arm 202 having a void 204 therebetween.

The sizes of the voids 196, 204, in preferred embodiments, are large enough to accommodate a gloved finger of a human hand, to assist with manipulation of the safety element relative to the air cleaner 1. For example, the voids 196, 204 define a cross-sectional area of at least 2 cm$^2$, typically 4–100 sq. cm². The projections 192, 198 are separated from each other by a landing 206 in the partition 189.

In preferred uses, the volume 205 defined by the landing 206 and the inner sides 207, 208 of each projection 192, 198 accommodates the apex 152 (FIG. 7) of the centering construction 150 of the core 57. In such preferred uses, the projections 192, 198 operate as guides 212, 214 to help operably orient the primary filter element 22 in place in the air cleaner 1. The guides 212, 214, along with the centering structure 150 help to center and place the filter element 22 within the air cleaner 1. This is explained further below in Section C(2).

Still in reference to FIGS. 11–14, the preferred safety element 20 includes a seal member 218 to help form a seal 220 (FIG. 4) between the safety element 20 and the air cleaner section 9 of the housing 2. In the one shown, the seal member 218 is secured to the band 180 around the entire periphery of the band 180. The seal member 218, in the one shown, forms a radially directed seal 221 (FIG. 4) between and against the band 180 and the inside surface 120 of the air cleaner section 9 of the housing 2. The seal member 218 includes at least one step 224 to assist with installation and removal of the safety element 20 into the region 32 (FIG. 4).

The safety filter element 20 can also be useful in preventing telescoping of the filter media 26 from the primary filter element 22. The air flow pressure as it flows downstream may create a force on the element 22 urging it to telescope. The safety filter element 20, when arranged adjacent to the downstream end 24, can help to prevent media telescoping.

Useful media 184 can include many different types of conventional filter media. This includes cellulose, synthetic, and various blends. One usable, convenient media is a synthetic/glass fiber blend having a weight of 70±4.0 lb./3,000 ft.² (114±6.5 g/m²); a thickness of 0.032±0.003 in (0.81±0.08 mm); a Frazier permeability of 165±20 ft./min. (50.3±6.1 m/min.); a pore size of 100±8 microns; a dry tensile strength of 19.8±6.6 lb./in (9.0±3 kg/in); and a burst strength of 20±5 psi (138±34 kPa).

One eye-catching, distinctive safety filter element 20 that is usable herein is depicted in commonly assigned U.S. design patent application filed on Apr. 2, 2003, carrying attorney docket 758.1521US01; entitled SAFETY FILTER ELEMENT; Express Mail No. EV 143555760 US; incorporated by reference herein.

2. Aligning/Centering Features With Primary Filter

In reference now to FIGS. 15–22, the interaction between the primary filter element 22 and the safety filter element 20 is illustrated. As discussed above, the primary filter element 22 defines a receiving socket 130 formed by a void in the media 26 when formed into the filter element 22. The receiving socket 130 functions to receive guide structure or centering structure to help properly mount the filter element 22 within the air cleaner 1. The guide or centering structure can include many different types of projections extending from internally within the air cleaner 1. In the particular preferred configuration shown, the guide or centering structure is part of the safety element 20. In particular, the guide or centering structure is embodied herein as guides 212, 214, which, are preferably also part of the handle 190 for the safety filter 20. It should be appreciated that, although the guides 212, 214 are shown as part of the safety element 20, in other embodiments, there can be other types of projections or guides within the air cleaner 1. Also as described above, in the preferred embodiment, the receiving socket 130 is aligned with core construction 57 defining receiver 138.

Figure 20:
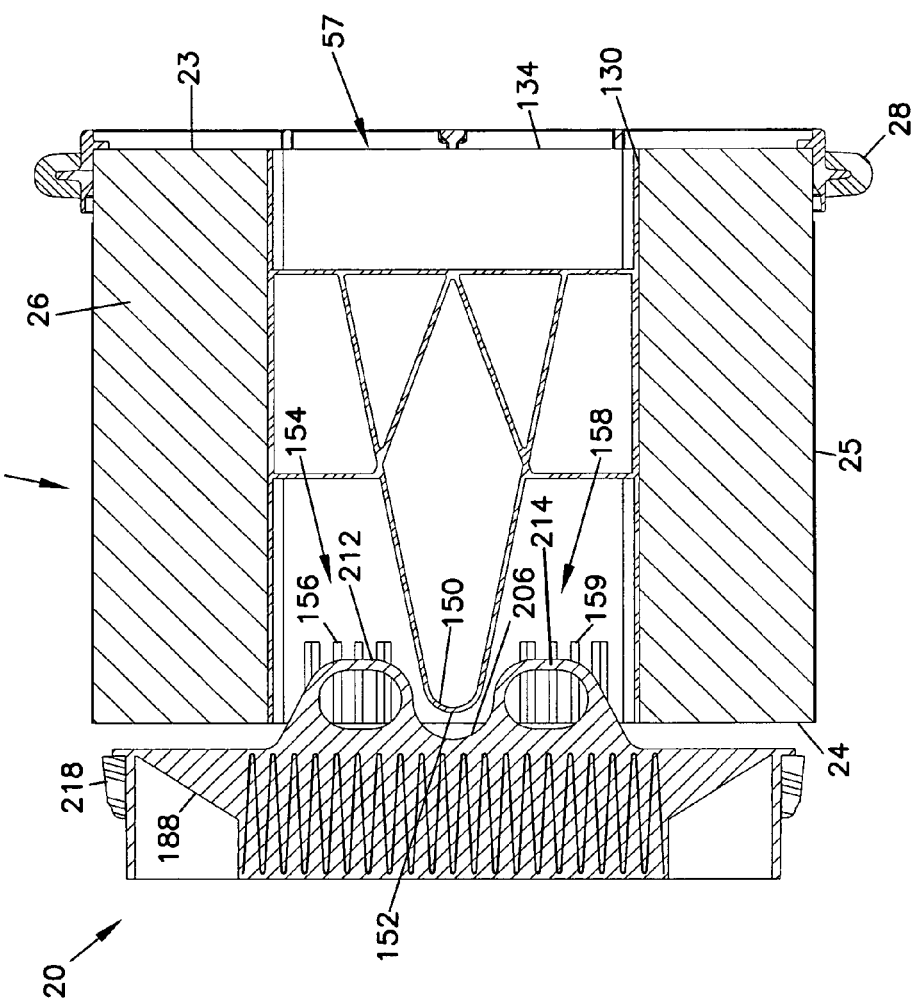
FIG. 20 is a cross-sectional view of the primary filter element and safety filter element interacting, the cross-section being taken along the line 20—20 of FIG. 18.

In FIGS. 20 and 22, the guides 212, 214 can be seen projecting into and received by the receiving socket 130 and the receiver 138 of the core 57. The apex 152 of the centering structure 150 can be seen extending between each of the guides 212, 214 and toward the landing 206 in the volume 205 (FIGS. 12 and 14) defined by the sides 207, 208 and landing 206.

In use, after the safety element 20 is properly installed within the air cleaner 1, the primary filter element 22 is inserted into the air cleaner section 9 of the housing 2. The opening of the receiver 138 is aligned with the guides 212, 214. The guides 212, 214 enter the receiver 138 into the receiving pockets 164, 166 (FIG. 7). The filter element 22 is aided in proper orientation by interaction between the apex 152 of the centering structure 150 and the guides 212, 214. The filter element 22, in preferred embodiments, is oriented so that the gasket 28 rests against the flange 71 of the air cleaner section 9 of the housing 2. The cover 7 containing the precleaner section 8 is then oriented over the end of the air cleaner section 9 of the housing and clamped closed. The clamping action causes compression of the gasket 28 between the flange 70 and the flange 71 to create a seal therebetween.

Each of the primary filter element 22 and the safety filter element 20 is removable and replaceable. Preferred methods for servicing are described below.

D. Usable Precleaner Constructions

Attention is now directed to FIGS. 2–4, a preferred precleaner section 8 is illustrated. While a number of different, conventional precleaners can be used upstream of the primary filter element 22, the particular precleaner 8 illustrated can be used to advantage.

As mentioned above, the precleaner 8 includes a plurality of centrifugal separator tubes 13. Each of the tubes 13 include an outer surrounding substantially cylindrical wall 228 that is tapered between opposite ends 229, 230. The end 229 has a smaller diameter than the end 230. The end 229 will be oriented upstream to the end 230. Located within the wall 228 is a vortex generator 232, including vanes or curved blades 234. The wall 228 also includes at its downstream end 230 an outlet port 236.

Each of the tubes 13 is received within an upstream baffle plate 238. The baffle plate 238 includes a plurality of apertures 240 sized to receive the upstream end 229 of the tubes 13. The upstream end 229 of each of the tubes has a tab 242 (FIG. 3) that is received within a slot 244, which is part of the aperture 240. This tab/aperture forms an indexing arrangement 246 (FIG. 3) that ensures that each of the outlet ports 236 on each of the tubes 13 is pointed in the direction toward the dust ejection tube 4.

The preferred precleaner 8 depicted also includes a plurality of extraction tubes 250 that are received within the tubes 228. In preferred implementations, each of the extraction tubes 250 is molded as an integral part of the cover 7. As such, in preferred embodiments, the cover 7 includes as an integral, molded, one-piece member: the side wall 252, the tube 14, a downstream baffle plate 254, and each of the extraction tubes 250.

To assemble the precleaner 8, each of the tubes 228 is inserted into a corresponding aperture 240 in the baffle plate 238. The indexing arrangement 246 is used by aligning the tab of each of the tubes 228 into a corresponding slot 244 to ensure that the outlet port 236 is pointed in a direction toward the ejector tube 4. The upstream baffle plate 238 with each of the tubes 228 installed therewithin is then oriented over the remaining portion of the precleaner 8. Each of the ends 230 of the tubes 228 is oriented over a corresponding extraction tube 250, and the baffle plate 238 is secured, such as by a snap fit, onto the side wall 252.

The precleaner 8 operates as follows: a gas flow stream containing particulate matter flows through the upstream end 229 of each of the tubes 13. The flow is induced to rotate by the vortex generator 232. The rotating nature of the flow stream causes centrifugal forces to act on the particulate matter in the gas flow stream. The particulate matter are heavier than the gas in the flow stream and migrates toward the wall 228. The particles are ejected from the outlet ports 236, while the remaining gas stream flows through the extraction tubes 250. From the extraction tubes 250, the air flows downstream and into the upstream flow face 23 of the primary filter element 22. The particulate matter that is ejected from the outlet ports 236 falls by gravity downwardly through the ejection tube 4 and out through the ejection valve 15.

E. Methods

In general, a method of sealing a filter element having a straight through flow construction, as described, is provided. The preferred method generally includes positioning opposing flanges of a cover and a primary air cleaner section, as described, in engagement with the projecting axial seal gasket (on the element) and axially compressing the gasket, as shown.

A method for mounting a sealing gasket on a filter element having a straight through flow construction, as described, is provided. One example method generally includes providing a filter element having a straight through flow construction.

In one example method, a gasket is extruded, cut to length, and then glued together to form a gasket ring. In other usable methods, a gasket is made from a moldable material, such as urethane foam and molded into a desired shape. The gasket ring is then snapped over and pressed onto a frame member. Specifically, the projection 102 is squeezed into the pocket 63. Adhesive is placed on the outer surface 56 of the main body 52 adjacent to the inlet end 23. The gasket 28/frame member 96 assembly is then mounted onto the main body 52 over the inlet end 23, until the lip 108 engages the inlet end 23. The tapered section 114 helps to guide the frame member 96 into place without damaging the main body 52.

To clean gas, first, the filter elements should be installed within the air cleaner. The cover 8, containing a precleaner, is removed from the air cleaner section 9 of the housing 2. The safety filter element 20 is provided. The safety filter element 20 is handled and manipulated by grasping the handle 190, such as putting fingers through the voids 196, 204. The safety filter element 20 is placed through the open end of the air cleaner section 9 and installed within the portion 32. The gasket 220 is compressed between and against the wall 9 to form a radial seal 221 between the safety filter element 20 and the air cleaner section 9.

Next, the primary filter element 22 is provided. The primary filter element 22 is manipulated such that the downstream end 24 is placed first through the open end of the air cleaner portion 9. The socket 130 is aligned with the guides 212, 214 to be received therein. In particular, the core 57 has receiver pockets 164, 166 in the receiver 138 that receive the guides 212, 214 therewithin. The centering structure 150 of the core 57 interacts with the guides 212, 214 to help align and center the primary element 22 within the air cleaner section 9.

The primary element 22 is centered as described above and oriented such that the gasket 28 rests upon the flange 71 of the air cleaner section 9. Next, the precleaner section 7 is oriented over the air cleaner section 9 so that the flange 70 rests on the gasket 28. The over center latches or clamps 17 are then used to apply axial force at joint 11 and form an axial seal with the gasket 28 between the precleaner section 7 of the housing and the air cleaner section 9 of the housing.

To clean gas, the gas enters the precleaner 7 through the centrifugal tubes 13. The vortex generator 232 causes the gas flow to rotate, which causes the particulate matter to migrate toward the walls 28. The particulate matter is then ejected through the outlet ports 236 and fall by gravity through the dust ejector tube 14. The precleaned gas then flows through the extraction tubes 250 and then through the inlet face 23 of the primary filter element 22. The media 26 removes further particulate material from the gas. The cleaned gas then flows through the outlet face 24. Next, the cleaned gas flows through the media 184 of the safety filter element 20, and then through the outlet tube 3. From there, the cleaned gas flows to downstream equipment, such as an engine.

After a period of use, the air cleaner 1 will require servicing. To service the air cleaner 1, the precleaner section 7 is removed from the air cleaner section 9 of the housing 2. This is done by releasing the clamps. When the clamps are released, this releases the axial seal formed by the sealing gasket 28. The upstream face of the filter element 22 is then exposed. The filter element 22 is grasped and removed from the air cleaner section 9. The primary filter element 22 can be disposed of or recycled, in convenient applications. If the safety filter element 20 also needs servicing, the handle 190 is grasped, and the safety element 20 is removed from the air cleaner section 9 and disposed of or recycled. It should be understood that in many applications, the primary filter element 22 will require replacement, while the safety filter element 20 will not require replacement.

If the safety filter element is being replaced, then a second, new safety filter element 20 is inserted into the housing 2, as described in the initial installation description above. Next, a new primary filter element 22 is provided and is installed within the air cleaner section 9, as described above. The precleaner section 8 is placed over the air cleaner section 9, and the axial seal is formed with the gasket 28.

The above described principles can be applied in a variety of embodiments and specific applications. From the general descriptions given, alternate applications to those described in the drawings will be understood. The invention, therefore, should not be interpreted as limited by the specification, but rather by the claims eventually issued.

What is claimed is:

1. An air filter cartridge comprising:
    (a) a z-filter media construction having an inlet flow face and an outlet flow face and an outer perimeter with a configuration;
        (i) the z-filter media construction defining a non-cylindrical receiving socket in at least one of the inlet flow face and the outlet flow face;
    (b) a non-cylindrical core arrangement within the z-filter media construction; the core arrangement having opposing walls lining said receiving socket;
        (i) said opposing walls defining at least one receiver pocket; and
    (c) a seal member mounted to the z-filter media construction;
        (i) the seal member being within 10 mm of the inlet flow face;
        (ii) the seal member being mounted along the outer perimeter of the z-filter media construction to have a same configuration as the z-filter media construction.

2. A cartridge according to claim 1 wherein:
(a) said core arrangement defines first and second receiver pockets.
3. A cartridge according to claim 2 wherein:
(a) said core arrangement extends completely between said inlet flow face and said outlet flow face.
4. A cartridge according to claim 1 wherein:
(a) one of said opposing walls of said core arrangement includes at least one region of corrugations.
5. A cartridge according to claim 1 wherein:
(a) said z-filter media construction includes a plurality of flutes; each of said flutes having an upstream portion adjacent to said inlet flow face and a downstream portion adjacent to said outlet flow face;
    (i) selected ones of said flutes being open at said upstream portion and closed at said downstream portion; and selected ones of said flutes being closed at said upstream portion and open at said downstream portion; and
(b) said media construction being a coiled configuration and defining said receiving socket in a center thereof.
6. A cartridge according to claim 1 wherein:
(a) the cartridge is racetrack-shaped.
7. A cartridge according to claim 1 further including:
(a) a frame member secured to the z-filter media construction; said frame member including a projection extending radially from an outer sidewall of the z-filter media construction;
    (i) said projection extending completely, peripherally, around said z-filter media construction; and
    (ii) the seal member being mounted to said projection of said frame member
        (A) the seal member being within 5 mm of the inlet flow face.
8. A cartridge according to claim 7 wherein:
(a) said frame member includes a band secured to the sidewall; said projection extending radially from said band.
9. A cartridge according to claim 8 wherein:
(a) said frame member includes a lip extending radially inwardly from said band;
    (i) said lip being in extension over at least a portion of one of said first inlet flow face and said outlet flow face.
10. A cartridge according to claim 9 wherein:
(a) said band has opposite first and second ends;
    (i) said lip extending from said band first end; and
    (ii) said band including a tapered section at said band second end.
11. A cartridge according to claim 10 wherein:
(a) said frame member further includes a cross-brace construction in extension from said lip and extending over said inlet flow face.
12. An air filter cartridge comprising:
(a) a filter media construction including an inlet flow face, an outlet flow face, and an outer perimeter with a configuration; a plurality of inlet flow flutes open at the inlet flow face and closed to passage of air therefrom adjacent the outlet flow face; and a plurality of outlet flow flutes closed adjacent the inlet flow face and open to outlet flow at the outlet flow face;
    (i) the configuration of the outer perimeter having opposite rounded end sections joined by first and second sections;
    (ii) the media construction defining a non-cylindrical receiving socket in at least one of the inlet flow face and the outlet flow face;
(b) a non-cylindrical core arrangement within the media construction; the core arrangement having opposing walls lining said receiving socket;
    (i) said opposing walls defining at least one receiver pocket; and
(c) a seal arrangement mounted to the outer perimeter of the filter media construction to have a same configuration as the filter media construction.
13. A cartridge according to claim 12 further including:
(a) a cross-brace construction extending over at least one of said inlet flow face and said outlet flow face.
14. A cartridge according to claim 12 wherein:
(a) said core arrangement defines first and second receiver pockets.
15. A cartridge according to claim 14 wherein:
(a) said core arrangement extends completely between said inlet flow face and said outlet flow face.
16. A cartridge according to claim 12 wherein:
(a) one of said opposing walls of said core arrangement includes at least one region of corrugations.
17. A cartridge according to claim 12 wherein:
(a) said media construction is a coiled configuration.
18. A cartridge according to claim 17 wherein:
(a) the coiled configuration defines the receiving socket in a center thereof.
19. A cartridge according to claim 17 wherein:
(a) the cartridge is racetrack-shaped.
20. A cartridge according to claim 12 wherein:
(a) the opposite rounded end sections of the media construction are semi-circular; and
(b) the first and second sections joining the opposite rounded end sections are straight and parallel to each other.
21. A cartridge according to claim 12 wherein:
(a) the seal arrangement includes a projection extending radially from an outer sidewall of the filter media construction;
    (i) said projection extending completely, peripherally, around said filter media construction; and
    (ii) the seal arrangement includes a seal member mounted to said projection;
        (A) said seal member extending completely, peripherally, around said filter media construction.
22. A cartridge according to claim 21 including:
(a) a frame member secured to the filter media construction; said frame member including the projection.
23. A cartridge according to claim 22 wherein:
(a) the frame member includes a band; said projection extends radially from said band.
24. A cartridge according to claim 23 wherein:
(a) said frame member includes a lip extending radially inwardly from said band;
    (i) said lip being in extension over at least a portion of one of said first inlet flow face and said outlet flow face.
25. A cartridge according to claim 24 wherein:
(a) said band has opposite first and second ends;
    (i) said lip extending from said band first end; and
    (ii) said band including a tapered section at said band second end.
26. A cartridge according to claim 21 including:
(a) a band secured to the sidewall; said projection extending radially from said band.
27. A cartridge according to claim 17 wherein:
(a) the cartridge is oval-shaped.

* * * * *